United States Patent
Endres et al.

(10) Patent No.: US 6,426,972 B1
(45) Date of Patent: Jul. 30, 2002

(54) REDUCED COMPLEXITY EQUALIZER FOR MULTI MODE SIGNALING

(75) Inventors: Thomas J. Endres, Perkasie; Samir N. Hulyalkar, Bensalem; Troy A. Schaffer, Langhorne; Christopher H. Strolle, Glenside, all of PA (US)

(73) Assignee: NxtWave Communications, Langhorne, PA (US)

( * ) Notice: Subject to any disclaimer, the term of this patent is extended or adjusted under 35 U.S.C. 154(b) by 0 days.

(21) Appl. No.: 09/100,705

(22) Filed: Jun. 19, 1998

(51) Int. Cl.[7] .................................................. H03H 7/30
(52) U.S. Cl. ........................................ 375/229; 375/233
(58) Field of Search .................................. 375/229, 232, 375/233, 235, 261, 270, 298, 321; 708/300, 301, 323, 425; 455/47, 203, 204, 109; 329/357

(56) References Cited

U.S. PATENT DOCUMENTS

| | | | |
|---|---|---|---|
| 4,864,403 A | | 9/1989 | Chao et al. .................. 358/167 |
| 5,056,117 A | | 10/1991 | Gitlin et al. ................. 375/234 |
| 5,517,535 A | | 5/1996 | Kroeger et al. ............. 375/373 |
| 5,588,025 A | | 12/1996 | Strolle et al. ............... 375/316 |
| 5,602,507 A | * | 2/1997 | Suzuki ........................ 329/304 |
| 5,619,154 A | | 4/1997 | Strolle et al. ............... 327/129 |
| 5,648,987 A | * | 7/1997 | Yang et al. .................. 375/232 |
| 5,757,855 A | | 5/1998 | Strolle et al. ............... 375/262 |
| 5,777,910 A | * | 7/1998 | Lu .............................. 708/323 |
| 5,867,486 A | * | 2/1999 | Sugiyama ................... 370/290 |
| 5,940,455 A | * | 8/1999 | Ikeda .......................... 375/350 |
| 5,970,093 A | * | 10/1999 | de Lantremange ......... 375/234 |
| 6,035,312 A | * | 3/2000 | Hasegawa ................... 708/322 |
| 6,055,318 A | * | 4/2000 | Whitecar .................... 381/94.2 |
| 6,069,917 A | * | 5/2000 | Werner et al. .............. 375/233 |
| 6,075,816 A | * | 6/2000 | Werner et al. .............. 375/229 |
| 6,088,389 A | * | 7/2000 | Larsson ...................... 375/231 |
| 6,125,151 A | * | 9/2000 | Chiba .......................... 375/326 |
| 6,144,697 A | * | 11/2000 | Gelfand et al. ............. 375/233 |
| 6,151,614 A | * | 11/2000 | Ikeda .......................... 708/322 |
| 6,222,592 B1 | * | 4/2001 | Patel ........................... 348/614 |

OTHER PUBLICATIONS

David A. Bryan, "QAM for Terrestrial and Cable Transmission", *IEEE Transaction On Consumer Electronics*, vol. 41, No. 3, pp. 389–391, Aug. 1995.

Richard Gitlin et al., "The Performance of Staggered Quadrature Amplitude Modulation in the Presence of Phase Jitter" *IEEE Transaction on Communication* vol. com–23, No. 3, Mar. 1975 pp. 348–352.

M. Simon et al., "Digital Communication Techniques, Signal Design and Detection", Prentice Hall, 1995.

(List continued on next page.)

*Primary Examiner*—Chi Pham
*Assistant Examiner*—Emmanuel Bayard
(74) *Attorney, Agent, or Firm*—RatnerPrestia

(57) ABSTRACT

A transmission channel equalizer system may be used to process either signals that have been modulated according to quadrature amplitude modulation (QAM) or vestigial sideband modulation (VSB) to convey digital symbols. The equalizer system includes a sparse digital filter having coefficients which are adaptively updated. The filter system includes a finite impulse response (FIR) filter which processes modulated pass-band RF signals and an infinite impulse response (IIR) filter which processes demodulated base-band signals. At least one of the FIR and IIR filters is implemented as a sparse filter. The filter system is responsive to a control signal to switch between processing QAM and VSB signals. The update algorithm for the equalizer employs a constant modulus algorithm (CMA) to acquire the digital signal and a decision directed (DD) algorithm to track the digital signal. The CMA algorithm used when VSB signals are processed is a single axis CMA (SACMA) algorithm. The filter converts the VSB signal into a pseudo QAM signal before the slicing operation which recovers the symbols from the converted VSB signal. The slicer identifies an encoded VSB symbol by partial trellis decoding and quantization from a reduced-set constellation.

44 Claims, 10 Drawing Sheets

OTHER PUBLICATIONS

D. N. Goddard, "Self–Recovering Equalization in Two–Dimensional Data Communication Systems" *IEEE Transaction on Communications*, vol. 28, No. 11, pp. 1867–1875, Oct. 1980.

J.R. Treichler et al., "A New Approach to Multipath Correction of Constant Modulus Signals", *IEEE Transactions on Acoustics, Speech Signal Processing*, vol. ASSP–31, No. 2, Apr., 1993.

R. W. Lucky, "Techniques for Adaptive Equalization of Digital Communication Systems" *Bell Systems Technical Journal*, vol. 45, No. 2, pp. 255–286, Feb. 1966.

R. Bartle, *Elements of Integration and Lebesque Measure*, John Wiley & Sons, New York, 1995.

Advanced Television Systems Committee, "ATSC Digital Television Standard" Doc. A/53, Apr. 12, 1995.

Advanced Television Systems Committee,–Guide To The Use Of The ATSC Digital Television Doc A/54, Apr. 12, 1995.

V. Eyuboglu and S. Qureshi, "Reduced–State Sequence Estimation for Coded Modulation on Intersymbol Interference Channels" *IEEE Journal on Selected Areas of Communications*, Aug. 1989.

A. Duel–Hallen and C. Heegard, Delayed Decision–Feedback Equalization, *IEEE Transactions on Communications*, May 1989.

G. Ungerboeck, "Trellis Coded Modulation with redundant Signal Sets Part I and II", *IEEE Communications*, Feb. 1987.

G. Ungerboeck, "Channel Coding With Multilevel/Phase Signals", *IEEE Transactions of Information Theory*, Jan. 1982.

A. Viterbi et al., *Principles of Digital Communications and Coding*.

J. G. Proakis, *Digital Communication*.

S. Haykin, *Adaptive Filter Theory*, Section 1.7, p. 33, Prentice Hall.

B. Widrow et al., "Adaptive Signal Processing", Engelwood Cliffs, NJ, Prentice Hall, 1985.

J. R. Treichler et al. "Thinned Impulse Responses for Adaptive FIR Filters", International Conference On Acoustics, Speech and Signal Processing, pp. 631–634, May 1982.

* cited by examiner

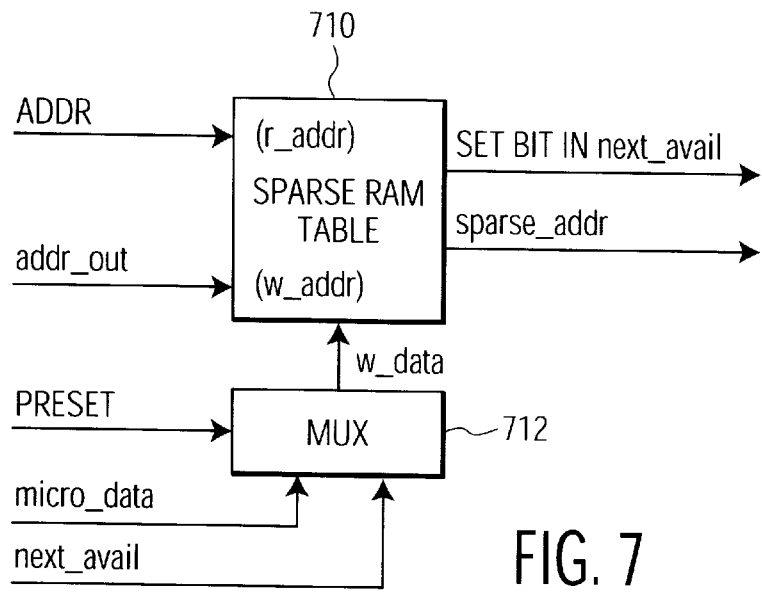
FIG. 7
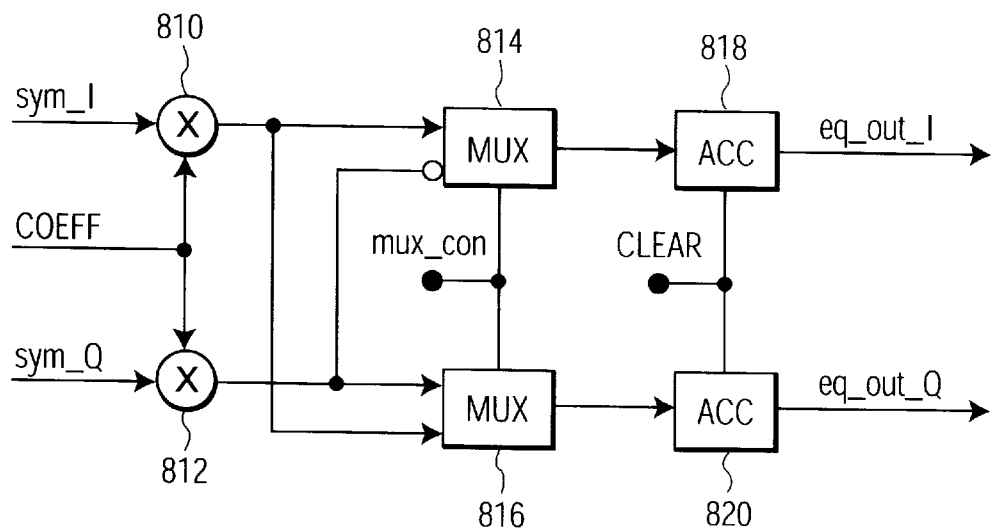
FIG. 8A
|  | mux_con | CLEAR |
|---|---|---|
| VSB | 1 | EVERY T/2 |
| QAM | TOGGLE | EVERY T |
FIG. 8B

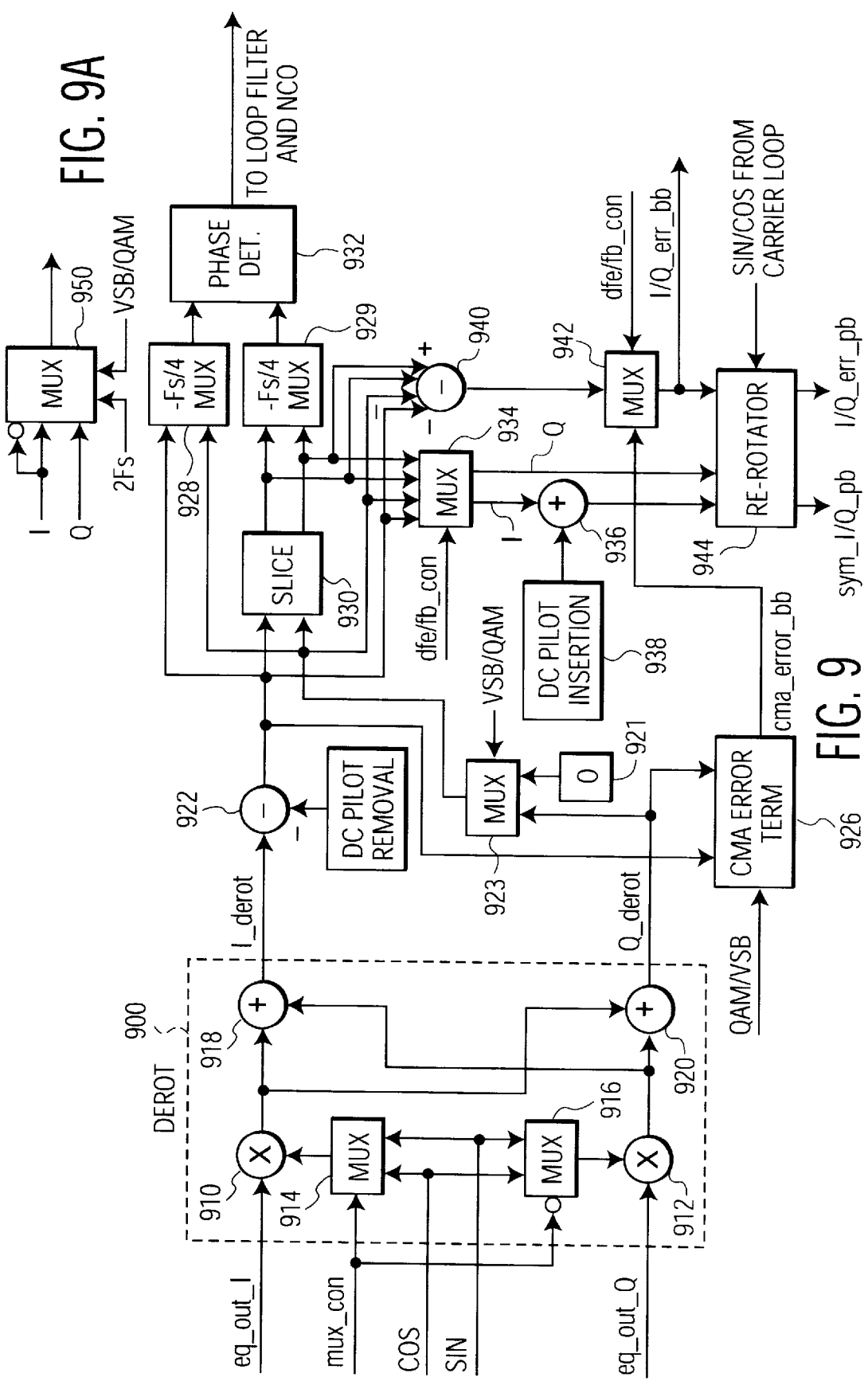

REDUCED COMPLEXITY EQUALIZER FOR MULTI MODE SIGNALING

BACKGROUND OF THE INVENTION

The present invention relates to transmission channel equalizers and in particular to an equalizer system suitable for use with a variety of modulated signals such as quadrature amplitude modulated (QAM) signals, vestigial sideband modulated (VSB) signals or NTSC video signals.

Digital data communication systems generally transmit symbols from a finite alphabet, A, at discrete, (usually periodic) time instants known as baud instances. These symbols can be used to modulate a Radio Frequency (RF) carrier's amplitude and phase for transmission over a variety of media (e.g. terrestrial, underwater, cable, etc.) to a remote receiver or user. There exist various modulation formats, which may be tailored to the application or transmission medium. Quadrature Amplitude Modulation (QAM) however, appears to be the de facto standard for cable TV, and Vestigial Sideband Amplitude Modulation (VSB) has been mandated by the Federal Communications Commission (FCC) as the format for broadcasting Digital Television signals with deployment beginning in November, 1998. Details of the VSB modulation system may be found in Annex D of "ATSC Digital Television Standard" Advanced Television Systems Committee, Document A/53, September, 1995, which is incorporated herein by reference for its teaching on VSB modulation and demodulation of digital television signals.

To provide reliable data estimates from either of these signaling formats (QAM or VSB), a receiver desirably performs a number of functions, including (but not limited to) RF demodulation, synchronization of a carrier loop to the RF carrier, synchronization of the clock signal to the baud sampling instants, equalization, and decoding. Because the transmitted signal is subject to a propagation medium which has a frequency response characteristic and may introduce distortion, an equalizer is used to compensate for the frequency response characteristic of the transmission channel and to mitigate the distortion caused by the transmission channel. The transmitted signal may also be distorted in the transmitter or the receiver, for example, by non-linear components, poorly terminated transmission lines, or finite processing hardware implementation. Collectively, these types of distortion are referred to herein as channel impairments. In a typical receiver, an equalizer may be used to correct the channel impaired signal by mitigating the effects of channel impairment distortion.

The characteristics of the distortion, however, are generally unknown to the receiver. Accordingly many equalizers use adaptive methods (i) for acquisition, to adjust the equalizer parameters from a cold-start initialization to a setting that removes the channel distortion, and (ii) for tracking, to allow the equalizer parameters to follow variations in the channel over time. There exist various equalizer architectures and many methods to adapt the equalizer parameters. One such equalizer is described in a paper by David A. Bryan entitled "QAM for Terrestrial and Cable Transmission" *IEEE Transactions On Consumer Electronics* vol. 41, no. 3, pp. 383–391, August, 1995 which is incorporated herein by reference for its teachings on QAM equalization. This equalization system employs a Constant Modulus Algorithm (CMA) to set the equalizer tap coefficients to first acquire the signal and then switches to a Decision Directed (DD) coefficient update algorithm to dynamically track changes in the received signal introduced by the transmission channel.

Another exemplary equalization system is a ghost cancellation system for broadcast television signals which conform to the standards adopted by the National Television Standards Committee (NTSC). This exemplary system uses an infinite-impulse response (IIR) filter, a training signal and a Least Square (LS) update algorithm to establish optimum coefficients for the IIR filter. The system is described in U.S. Pat. No. 4,864,403 to Tzy-Hong Chao et al. entitled ADAPTIVE TELEVISION GHOST CANCELLATION SYSTEM INCLUDING FILTER CIRCUITRY WITH NON-INTEGER SAMPLE DELAY, which is incorporated by reference herein for its teachings on channel equalization techniques.

SUMMARY OF THE INVENTION

The present invention is embodied in a transmission channel equalizer system which may be used to process modulated radio frequency signals or acoustic signals. The processed signals may be analog signals or signals that have been modulated to convey digital symbols. The equalizer system includes a sparse digital filter having coefficients which are adaptively updated.

According to one aspect of the invention, the coefficients are adaptively updated without reference to a training signal.

According to another aspect of the invention, the selection of the sparse taps and the association of coefficients with the taps is also adaptive.

According to yet another aspect of the invention, the filter system includes a finite impulse response (FIR) filter which processes modulated pass-band RF signals and an infinite impulse response (IIR) filter which also processes pass-band signals. At least one of the FIR and IIR filters is implemented as a sparse filter.

According to yet another aspect of the invention, the IIR filter processes demodulated base-band signals.

According to yet another aspect of the invention, the filter system may process vestigial side-band modulated (VSB) signals;

According to yet another aspect of the invention, the filter system may process quadrature amplitude modulated (QAM) signals;

According to yet another aspect of the invention, the filter system may be dynamically changed to process either QAM or VSB signals.

According to yet another aspect of the invention, the filter system uses a single axis constant modulus algorithm (SACMA) to update the filter coefficients during acquisition of a VSB signal.

According to yet another aspect of the invention, the filter system includes apparatus which converts a VSB signal into a QAM signal for processing by the carrier recovery circuitry, thus allowing circuitry reuse with QAM and VSB signals.

BRIEF DESCRIPTION OF THE DRAWINGS

FIGS. 5, 6 and 7 are block diagrams which describe a sparse controller suitable for use in the filter circuitry shown in FIG. 3.

FIG. 8A is a block diagram of a multiply-accumulate circuit suitable for use in the filter circuitry shown in FIG. 3.

FIG. 8B is a table which shows signal values used by the multiply accumulate circuit shown in FIG. 8A when QAM or VSB signals are processed.

FIG. 9 is a block diagram of derotator/rerotator circuitry suitable for use with the filter circuitry shown in FIG. 3.

DETAILED DESCRIPTION

Figure 1:
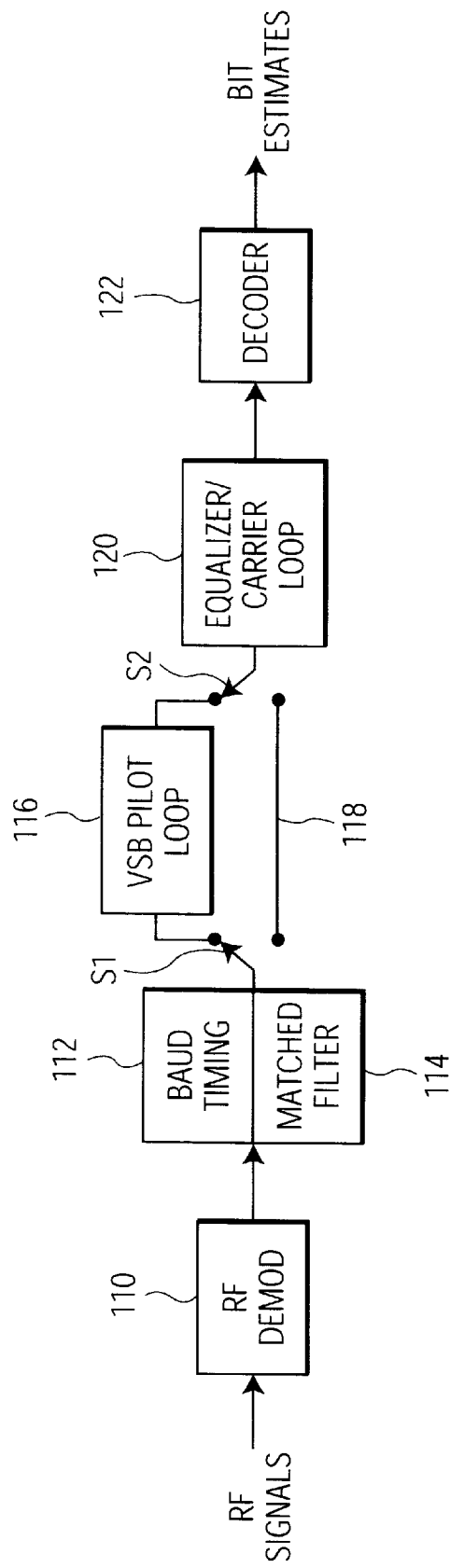
FIG. 1 is a block diagram of a digital signal receiver and decoder which includes an embodiment of the invention.

An exemplary receiver architecture is illustrated in FIG. 1. A radio frequency (RF) demodulator 110 receives an RF signal which has been modulated using either QAM or VSB and translates the frequency spectrum of the received signal to near baseband, so that its center frequency is approximately zero. The output signal of the demodulator 110 is not, however, a demodulated baseband signal but a modulated passband signal. The exemplary RF demodulator is a synchronous demodulator which provides both in-phase (I) and quadrature-phase (Q) signal components. In the drawing Figures, the I and Q signal components are shown as a single line even though they may be conveyed by two conduction paths.

The RF demodulator 110 also generates digital samples of the RF signal. These samples may be taken at a sample rate greater than the symbol rate (baud rate) of the modulated signal. In the exemplary embodiment of the invention, the samples provided by the RF demodulator 110 are at approximately four-times the symbol rate.

The passband signal provided by the RF demodulator 110 is first interpolated and then filtered by a matched filter 114 prior to being sampled by the baud timing recovery circuit 112. The frequency spectrum of the matched filter 114 depends on the filtration that was applied to the signals at the transmitter. For example, if the transmitter (not shown) applied a square-root raised cosine frequency response characteristic to the digital signal, the matched filter 114 also applies a square-root raised cosine characteristic. The cascade combination of these two filters provides a signal having minimal inter-symbol interference (ISI).

Baud synchronization by the baud timing circuitry 112 is accomplished without knowing the exact carrier frequency or phase by band-edge, phase-lock techniques. These techniques are described in U.S. patent application Ser. No. 08/602,943 entitled "A QAM/VSB RECEIVER" Ser. No. 08/721,663 entitled "RECEIVER CAPABLE OF DEMODULATING MULTIPLE MODULATION DIGITAL FORMATS" which are incorporated herein by reference for their teaching on baud synchronization. This method introduces minimal additional error under perfect signaling conditions.

If the signal being processed is a VSB signal then processing is switched, by switches S1 and S2 to pass the received signal through the VSB pilot loop 116. This loop synchronizes a local oscillator signal to the pilot component of the VSB signal. This pilot signal is described in the above-referenced ATSC Digital Television Standard.

If the signal being processed is a QAM signal, then path 118 is selected using the switches S1 and S2 because the QAM signal does not include a pilot signal component.

The output signal of the switch S2 is applied to an equalizer/carrier loop recovery circuit 120, described below, which includes an embodiment of the present invention. This circuitry compensates for multipath distortion and for the frequency response characteristic of the transmission channel and includes a phase locked loop (PLL) which determines the frequency and phase of the residual carrier signal to provide samples of the completely demodulated signal for application to the decoder 122. The decoder 122 may include both a QAM decoder and a VSB decoder and may be controlled to switch between the two decoders to properly process the signal that is being received.

The exemplary equalizer included in the equalizer and carrier loop circuitry 120 is robust and computationally-efficient. The computational efficiency comes in part from the implementation of the equalization filters as sparse filters and in part because much of the equalizer circuitry is used to process both QAM and VSB signals.

Figure 2A:
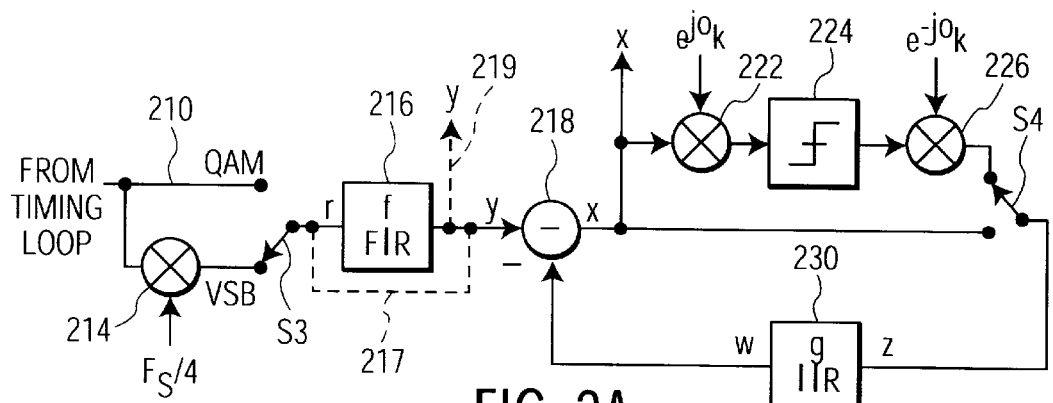
FIG. 2A is a block diagram of an exemplary equalizer suitable for use in the digital signal receiver shown in FIG. 1.

The exemplary adaptive equalizer structure is shown in FIG. 2A. This equalizer includes a forward or finite impulse response (FIR) section 216 and a feedback or infinite impulse response (IIR) section 230. Although the exemplary embodiment shows both an FIR filter and an IIR filter, it is contemplated that an equalizer according to the subject invention may be made using only the FIR filter section 216 or only the IIR filter section 230. These alternate configurations are illustrated by the connections 217 and 219, shown in phantom, in FIGS. 2A and 2B. If the equalizer includes only the IIR section 230, then the FIR filter 216 is replaced by the connection 217. If only the FIR filter 216 is used, then the subtracter 218 and filter section 230 are removed and the output of the equalizer is the signal y as indicated by the connector 219 or the output symbols provided by the slicer 224, as described below.

In the exemplary embodiment of the invention shown in FIG. 2A, QAM signals are applied directly to the FIR filter 216 while partially demodulated SQAM signals from the timing loop are first converted to VSB signals by shifting the modulated carrier in phase by a frequency of $F_S/4$. Switch S3 applies either the QAM signals or the converted VSB signals to the FIR filter section 216. The FIR section receives data at a residual carrier frequency offset because, as described above, the RF demodulator 110, shown in FIG. 1, does not provide a baseband signal. Thus, the FIR filter 216 operates in the passband (away from DC). The FIR filter 216 is fully described at any given instant by its vector of tap weights (or coefficients) and written as a vector of impulse response coefficients $f=[f_0\ f_1\ \ldots\ f_{N-1}]^T$ where each of the values $f_0$ through $f_{N-1}$ is a complex value. Similarly, the vector of tap weights for the feedback or IIR filter is fully described by a vector of impulse response coefficients $g=[g_0\ g_1\ \ldots\ g_{L-1}]^T$, where each of the values $g_0$ through $g_{L-1}$ is a complex value. The input signal to the FIR filter is the vector r and the output signal of the FIR filter is the scalar $y=r^Tf$. The input signal to the IIR filter is the vector z and the output signal of the IIR filter is the scalar $w=z^Tg$. The output signal of the IIR filter is subtracted from the signal y in the subtracter 218 to produce the signal x. It is this signal x which is applied to the carrier loop circuitry.

The carrier loop circuitry generates a carrier signal corresponding to the carrier frequency of the passband signal provided by the RF demodulator 110. This carrier signal is used to exactly demodulate the QAM or VSB signal in order to recover the data values. Exemplary carrier loop circuitry is described below with reference to FIGS. 9 and 10. The equalizer and carrier loop circuitry shown in FIG. 2A operates in two modes, acquisition and tracking. When the equalizer is operated in acquisition mode, the switch S4 connects the output port of the subtracter 218 directly to the input port of the IIR filter 230.

When the equalizer is used for tracking, switch S4 is switched to add the slicer 224 into the feedback loop. In the exemplary embodiment of the invention, the slicer 224 is part of carrier loop circuitry (not shown in FIGS. 2A and 2B) which is described below with reference to FIGS. 9 and 10. In this configuration, the output signal of the IIR filter 230 is subtracted from the output signal of the FIR filter 216 and then shifted to baseband by multiplying it, in the mixer 222, by the current estimate of the complex conjugate of the residual carrier offset. The baseband signal is then quantized by the slicer 224 in order to form the error calculation used by the equalizer in DD mode, as described below, and shifted back into the passband by multiplication, in the mixer 226 by $e^{j\theta_k}$, the current estimate of the residual carrier offset. The output signal of the carrier loop circuitry 220 is then fed back into the input port of the IIR filter 230 via switch S4.

The exemplary embodiment of the invention gains efficiency by converting the VSB signals into QAM signals. In a paper by Richard Gitlin et al. entitled "The Performance of Staggered Quadrature Amplitude Modulation in the Presence of Phase Jitter" *IEEE Transactions on Communication* vol. com-23, no. 3, March 1975 pp 348–352, it is recognized that a staggered quadrature amplitude modulated (SQAM) signal having an offset equal to T/2, where T is the baud interval, is equivalent to a VSB signal with a carrier frequency $\omega_0\pm(\pi/2)$ and with identical pulse and vestigial spectral shaping. Thus, if the symbol timing of the VSB signal is substantially exact, it may be converted into an SQAM signal by shifting it's carrier frequency by $F_S/4$, where $F_S$ is the symbol frequency, and the SQAM signal may be converted to a QAM signal by delaying the I samples by one-half symbol period.

One embodiment of the invention uses this technique to convert the VSB signals into SQAM signals so that a single QAM slicer may be used to quantize either a QAM signal or a VSB signal when the equalizer is operated in DD mode. A QAM slicer is a "nearest element" decision device in which the I and Q components of the QAM signal are mapped or quantized into the nearest element in the QAM constellation. In this mapping, "distance" is a measure of the difference between the I and Q values of the sample and each of several I and Q values of symbols in the constellation. The symbol having the smallest difference in magnitude (i.e. $|\Delta I|^2+|\Delta Q|^2$) is the "nearest" symbol to the sample. An exemplary QAM slicer is described in a text by M. Simon et al. entitled *Digital Communication techniques, Signal Design and Detection*, Prentice Hall, 1995 which is incorporated herein by reference for its teaching on QAM quantization. In another embodiment of the invention, separate slicers are used for QAM and VSB. One exemplary VSB slicer is a partial trellis decoder. Other exemplary VSB slicers are described below with reference to FIGS. 13 and 14.

Figure 2B:
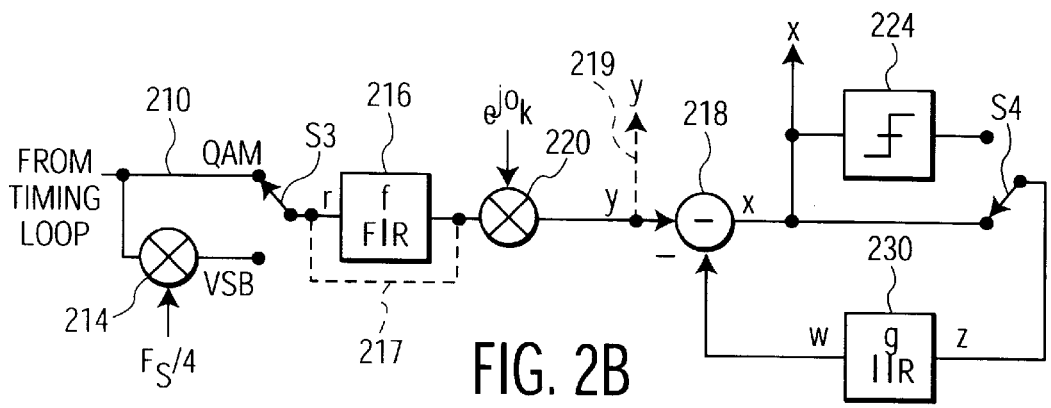
FIG. 2B is a block diagram of an alternative equalizer suitable for use in the digital signal receiver shown in FIG. 1.

FIG. 2B is an alternative embodiment of the adaptive equalizer structure. In the embodiment shown in FIG. 2B, the FIR filter section 216 processes passband signals while the IIR filter section 230 processes baseband signals. In FIG. 2B, elements 210, 214, S3 and 216 operate in the same way as shown in FIG. 2A. In the equalizer shown in FIG. 2B, however, the passband signal provided by the FIR filter 216 is converted to a baseband signal by mixer 220, which multiplies the passband signal by $e^{j\theta_k}$, the current estimate of the complex conjugate of the residual carrier signal. The output signal of mixer 220 is then applied to the subtracter 218 which subtracts the output signal of the IIR section 230 from the output signal of the mixer 220. The output signal of the subtracter 218 is then applied directly to one pole of switch S4 and through slicer 224 to the other pole of switch S4. When operating in acquisition mode, switch S4 applies the output signal of the subtracter 218 to the input port of the IIR filter section 230. When operating in tracking mode, switch S4 applies the output signal of the slicer 224 to the input port of the IIR filter 230.

The exemplary embodiment of the equalizer shown in FIG. 2B allows the IIR filter section 230 to compensate the input signal over a wider range of delay values than the embodiment shown in FIG. 2A because, as described below, in the passband embodiment shown in FIG. 2A, each tap position uses two coefficients (I and Q) and, thus, two multipliers, while, for the embodiment shown in FIG. 2B, only one coefficient and one multiplier are used for each tap position.

In the exemplary embodiment of the invention, the estimate of the residual carrier offset comes from a decision directed (DD) carrier loop, described below. The algorithms which govern the adaptation process of the equalizer coefficients are described first for QAM and then for VSB signaling.

This section describes the algorithms used to adjust the equalizer coefficients (or tapped delay line weights) during acquisition and tracking for both QAM and VSB signaling. The Constant Modulus (CM) criterion, and its stochastic gradient descent, the Constant Modulus Algorithm (CMA), are described in an article by D. N. Godard entitled "Self-Recovering Equalization in Two-Dimensional Data Communication Systems" *IEEE Transactions on Communications*, vol. 28, no. 11, pp. 1867–1875, October 1980, and in an article by J. R. Treichler et al. entitled "A New Approach to Multipath Correction of Constant Modulus Signals" *IEEE Transactions on Acoustics, Speech and Signal Processing*, vol. ASSP-31, no. 2, April, 1983, which are incorporated herein by reference for their teachings on CMA. CMA does not require the use of a training or pilot signal to interrupt broadcast; thus, equalization using CMA is said to be blind equalization. CMA operates by minimizing the squared difference between the equalized signal power and an estimate of the expected power of the equalized signal. The inventors have modified the CMA error calculation developed by Godard for application to VSB signals. For a QAM or VSB signal, the error signal, $e_{CMA}$, for the blind coefficient update is given by equation (1).

$$e_{CMA} = z_k(\gamma - |z_k|^2) \qquad (1)$$

where $\gamma$ is the Godard radius of the constellation, a normalized measure of the mean power of the constellation, and $z_k$ is the output signal of the equalizer circuit.

Once the carrier has been acquired with the equalizer using the CMA algorithm, the system switches to become a decision feedback equalizer (DFE), using a decision directed (DD) Least Mean Squares (LMS) algorithm to track variations in the carrier frequency and phase. The LMS algorithm is a well-known adaptive algorithm. Unlike CMA, it descends a quadratic cost function. In most implementations, the LMS algorithm requires the (periodic) transmission of a training sequence to form the error update term, and is thus said to be trained. In the exemplary embodiment of the invention, however, the LMS algorithm need not be trained but may operate using pseudo-blind steering by replacing this training signal with the best estimate of the transmitted symbols. This technique is called decision directed LMS and is described in an article by R. W. Lucky entitled "Techniques for Adaptive Equalization of Digital Communication Systems" *Bell Systems Technical Journal*, vol. 45, no. 2, pp 255–286, February 1966, which is incorporated herein for its teaching on the DD LMS algorithm.

For the reception of QAM and VSB signals, both the FIR and IIR sections of the equalizer may be operated in the passband, and, thus, the same error calculation may be used to adapt the coefficients. The equalizer is "turned-on" or initialized in acquisition mode, with switch S4 set to bypass the slicer 224. When used for acquisition both the passband FIR and IIR sections are updated at each baud instance using the Constant Modulus Algorithm. In the exemplary embodiment of the invention, precisely the same CMA error calculation is applied to the FIR and IIR sections. For example, the FIR section is updated according to equation (2)

$$f_{k+1} = f_k + \mu_1 e_k r_k^* \qquad (2)$$

and the IIR section is updated according to equation (3)

$$g_{k+1} = g_k + \mu_2 e_k z_k^* \qquad (3)$$

where $\mu_1$ and $\mu_2$ are small, positive step sizes, $r_k$ and $z_k$ are regressor vectors of inputs to the FIR filter 216 and the IIR filter 230, respectively and $\gamma$ is the Godard radius, a constant which depends on the statistics of the modulation format, as described in the above-referenced article by Godard. Exemplary formulas for $e_k$ are shown in Table 1.

| | FIR error term | IIR error term |
|---|---|---|
| QAM or VSB acquisition | | |
| FIG. 2A (passband/ passband) | $e_k = x_k(\gamma - |x_k|^2)$ | $e_k = x_k(\gamma - |x_k|^2)$ |
| FIG. 2B (passband/ baseband) | $e_k = e^{j\theta_k} x_k(\gamma - |x_k|^2)$ | $e_k = x_k(\gamma - |x_k|^2)$ |
| QAM or VSB tracking | | |
| FIG. 2A (passband/ passband) | $e_k = e^{j\theta_k}(e^{-j\theta_k} x_k - Q\{e^{-j\theta_k} x_k\})$ | $e_k = e^{j\theta_k}(e^{-j\theta_k} x_k - Q\{e^{-j\theta_k} x_k\})$ |
| FIG. 2B (passband/ baseband | $e_k = e^{j\theta_k}(x_k - Q\{x_k\})$ | $e_k = (x_k - Q\{x_k\})$ |

Where multiplication by $e^{j\Theta_k}$ represents derotation, multiplication by $e^{-j\Theta_k}$ represents rerotation, and $Q\{x\}$ represents a best guess at the quantization of the sample x.

When the equalizer is used for tracking, switch S4 is configured to put the slicer 224 into the feedback loop. The adaptation algorithm used to calculate the equalizer error update is changed from CMA to Decision Directed (DD) Least Mean Squares (LMS). This is accomplished by changing the error calculation $e_k$ for both the passband FIR filter 216 and IIR filter 230 and also changing the regressor vector, $z_k$ to be a rerotated quantized vector, as summarized in Table 1. This method shifts the output signal of the FIR section to baseband using the derotator 222 so that the quantizer 224 can be used to calculate the error signal and then rerotates the baseband signal, using the rerotator 226, to maintain a passband IIR section.

When the receiver is to be used for VSB signals (such as DTV broadcast reception) the architecture of the equalizer changes little from that used for QAM signals. The main differences are that the received samples are first frequency shifted by $F_S/4$ by the mixer 214 and the coefficients of the FIR filter section 216 and the IIR filter section 230 are converted from complex to real-valued coefficients. For QAM signals a "full complex" multiplication is used for each QAM baud period. For VSB, a "half complex" multiplication is used for each VSB baud period. Because the VSB baud periods occur at twice the rate of the QAM baud periods, the computational requirements for both the QAM and VSB modes are equivalent. Shifting the input signal by $F_S/4$ is easily accomplished by a multiplexing operation since $F_S/4$ is equivalent to a sequence of +1, 0, −1, 0, +1, . . . The IIR filter is operated in the passband for one exemplary embodiment of the invention when VSB signals are processed to reflect the T versus T/2 spacing of I and Q components between QAM and VSB signaling, respectively. That is to say, VSB signal processing desirably operates at twice the symbol rate of the QAM signal to achieve the same information rate. A baseband IIR section processing a VSB signal, however, uses one-half of the multiplication operations that a passband IIR section would use because the quadrature component of the baseband signal is zero. Thus, two baseband taps have the same computational complexity as one passband tap. The equalizer time spans for QAM and VSB can thus be made comparable. This baseband IIR section 230 is accomplished by derotating the output signal of the FIR filter section 116 in the mixer 220 before the output signal of the FIR filter section is applied to the subtracter 218.

In VSB mode, the equalizer is "turned-on" or initialized in acquisition mode, with switch S4 set to bypass the slicer 224 of the carrier loop circuitry. Both the FIR and IIR filters are updated at each baud instance by using a modified version of CMA, single-axis CMA (SACMA), so called because the equalizer coefficients are constrained to be real. For example, the FIR filter 216 and the IIR filter 230 are updated according to equations (4) and (5)

$$f(k+1) = \Re[f_k] + \Re[\mu_3 e_k r_k^*] \quad (4)$$
$$g(k+1) = \Re[g_k] + \Re[\mu_4 e_k z_k^*] \quad (5)$$

where $\Re[x]$ represents the real component of the vector x.

During VSB processing using the configuration shown in FIG. 2B, when the equalizer is switched to tracking mode, switch S4 is activated to switch the slicer 224 of the carrier loop circuitry into the feedback loop. The adaptation algorithm used to calculate the equalizer error update is changed from SACMA to a real-only version of DD-LMS. This is accomplished by changing $e_k$ for the FIR and IIR sections and also the regressor vector for the IIR section (see Table 1).

The update equations (2), (3), (4) and (5) are described in their "full-complexity" implementation in that all equalizer coefficients are updated simultaneously. In practical implementations, however, the calculation of $e_k$, which has a complexity that depends linearly on the number of equalizer coefficients, may result in a prohibitive computational burden. The exemplary embodiment of the invention reduces the computational burden by reducing the number of equalizer coefficients that are updated at any one time (baud instance) and the number of coefficients that are used in the update calculation. Thus, equations (2)–(5) are applied to a subset of the full-length tapped delay line and the remaining coefficients are not updated. This procedure is therefore referred to as sparse equalization. Furthermore, the subset of coefficients that are updated at any baud instance is itself adaptive (i.e. this subset is dynamically changed). This subset does not, in general, contain coefficients which are contiguous or adjacent in the tapped delay line.

The sparse coefficients define a set of indices or coefficient positions in the tapped delay line and are referred to as the index set. The exemplary adaptive sparsing approach may then be described in terms of adapting the index set. Furthermore, the adaptive sparsing approach may be described for any arbitrary tapped delay line and any equalizer update algorithm used to calculate the update error term. Hence, this description applies to each tapped delay line, i.e., the FIR and IIR sections may each be adaptively sparsed, independently of one another. It is contemplated, for example, that each of the FIR filter 216 and the IIR filter 230, shown in FIGS. 2A, 2B and 2C may be implemented in multiple sections and that each section may be independently adaptively sparsed. Furthermore, the adaptive sparsing algorithm described below may be applied to many different types of adaptive equalizers which employ gradient descent schemes that may or may not be stochastic. Examples of equalizing algorithms with which this adaptive sparsing algorithm may be used are those in the Bussgang family, BGR (Benveniste et al.), Shalvi and Weinstein, LMS family and Sato.

Figure 2C:
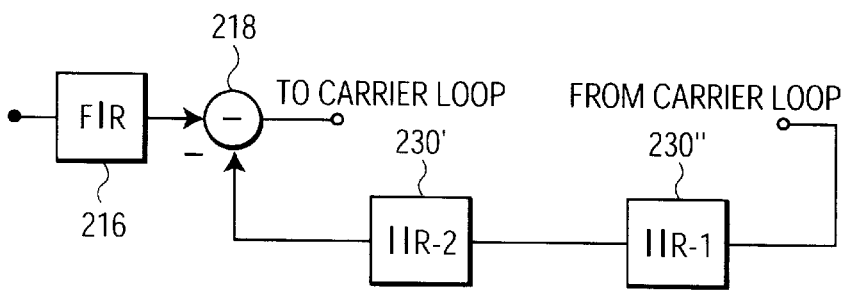
FIG. 2C is a block diagram of another alternative equalizer suitable for use in the digital signal receiver shown in FIG. 1.

FIG. 2C is a block diagram of an alternative equalizer system in which the IIR filter is divided into two component IIR filter sections 232 and 236. As described above, the FIR and each of the IIR filters used in the equalizer are sparse filters. Only a subset of the coefficients for a filter is updated during any baud instance. The FIR filter 216 and IIR filter sections 232 and 236, shown in FIG. 2B, may be independently sparsely updated using differing numbers of coefficients.

Figure 2D:
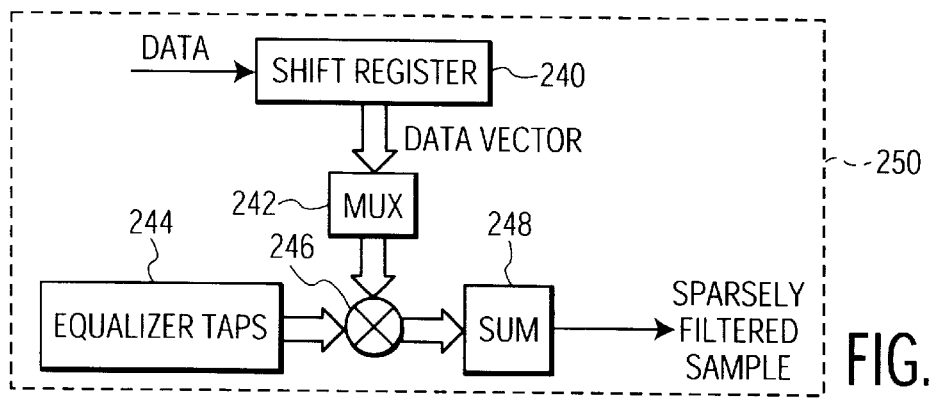
FIG. 2D is a block diagram which illustrates an exemplary structure for one of the filter sections shown in FIGS. 2A, 2B and 2C.

FIG. 2D is a block diagram which illustrates an exemplary FIR filter structure that may be used for any one of the FIR or IIR filter sections shown in FIGS. 2A, 2B and 2C. Signal data is applied to a shift register 240 having taps which are applied to a multiplexer 242. The multiplexer selects one or more of the taps to apply to a multiplier network 246. The multiplier network includes one multiplier for each tap that is selected by the multiplexer 242. Each multiplier in the multiplier network 246 is coupled to receive a corresponding equalizer coefficient value from a coefficient memory 244. The multipliers form the respective products of the signal values from the shift register taps and the coefficients and apply the products to a summing network 248. The summing network 248 provides a signal which represents the sparsely filtered signal. Although not shown in FIG. 2D, it is contemplated that the shift register 240 may be implemented in a random access memory (RAM) as a circular queue and the multiplexer 242 may concurrently or sequentially fetch stored samples from multiple addressed tap addresses. In addition, the values for the equalizer coefficients may be adaptively changed as may the positions of the equalizer taps. Exemplary circuitry for performing these functions is described below with reference to FIGS. 3–8B.

Figure 3:
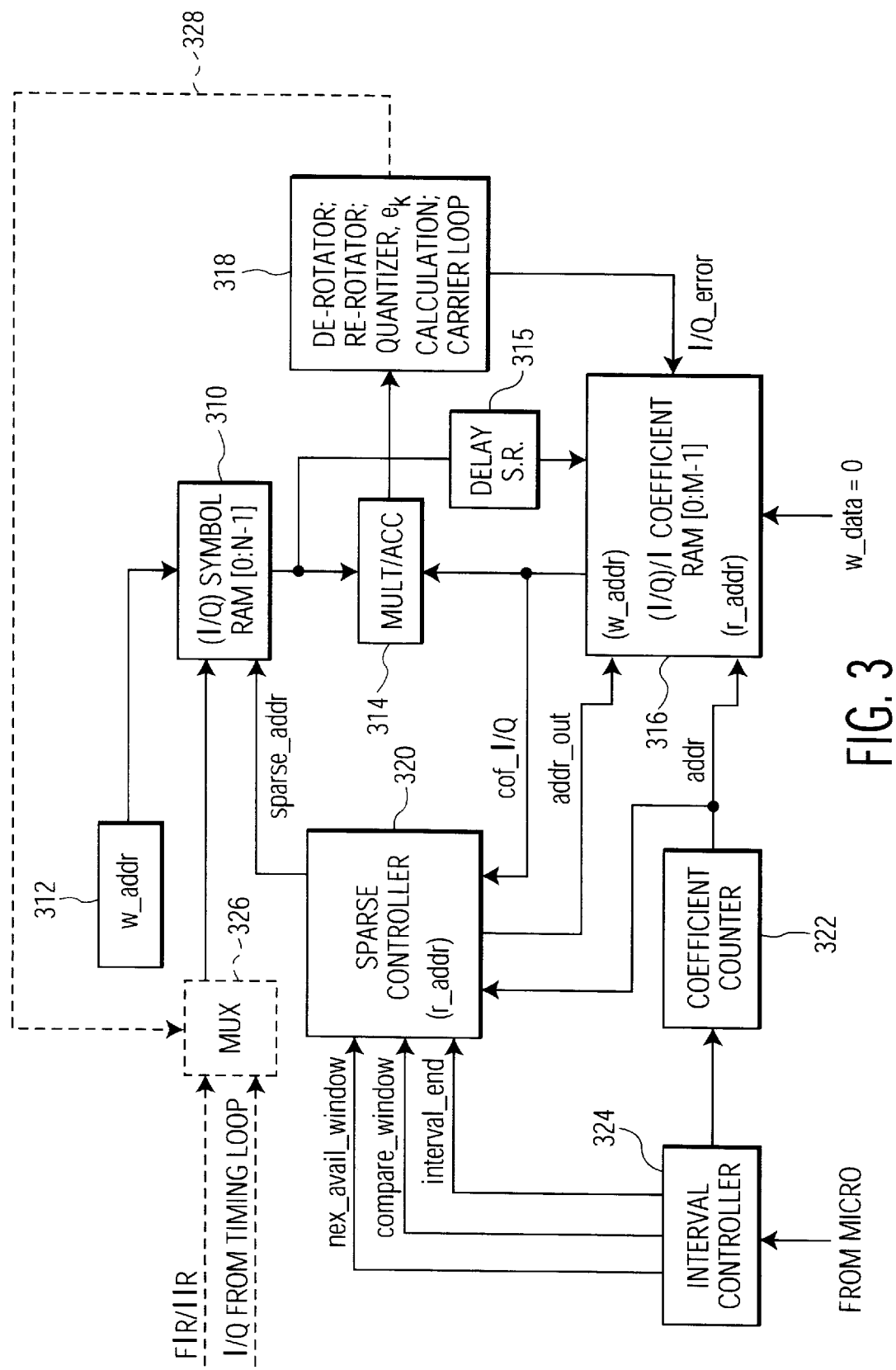
FIG. 3 is a block diagram of filter circuitry which may be used to implement either of the equalizers shown in FIGS. 2A and 2B.

FIG. 3 is a block diagram of an exemplary sparse filter section according to the present invention. The circuitry shown in FIG. 3 operates at a clock frequency which is a multiple of the baud frequency. At each baud instance, each of the coefficients in the index set multiplies appropriate I and Q data samples to apply the frequency response characteristic of the filter to the input stream in order to produce filtered I and Q values for the output stream. The input I and Q data samples are applied to an optional multiplexer 326 and stored into the symbol RAM 310. In the exemplary embodiment of the invention, the symbol RAM 310 is a circular buffer which receives a write address from write address generator 312 in order to write the I and Q data values into the memory 310. Write address generator 312 is synchronized to the output signal of the timing loop which determines when the I and Q signals are sampled. The symbol RAM 310 stores the data in the delay line of the FIR filter 216 (shown in FIG. 2A) and optionally the IIR filter 230 as well. The input data values which are to be multiplied by the filter coefficients and summed to form a filtered output value are accessed responsive to a sparse address provided by the sparse address generator 320. These values are applied sequentially to a multiply accumulate circuit 314 where they are multiplied by the I and Q coefficient values in the index set and then summed to produce the filtered output value. The filter coefficients are provided by the coefficient RAM 316 responsive to the coefficient counter 322. The sparse controller 320, coefficient counter 322 and write address generator 312 are synchronized by the interval controller 324 so that the addresses of the delayed I and Q data values that are needed to produce the current filtered data value are applied to the multiply accumulator circuit 314 at the same time as the respective coefficients from the current index set for the filter.

The output signals of the multiply accumulate circuit 314 are applied to a derotator/rerotator circuit 318. The circuit 318 also includes the carrier loop circuitry. The derotator/rerotator 318 is described below with reference to FIG. 9. As shown in FIG. 2A, the output signal of the carrier loop circuitry is applied to the IIR filter 230.

In one exemplary embodiment of the invention, the symbol RAM 310 also implements the delay line of the IIR filter 230. I and Q data values for the IIR filter are applied to the symbol RAM 310 via the connection 328 and the multiplexer 326. The control signal for the multiplexer 326 is the signal fir/iir. This signal may be at twice the rate at which the I and Q data values are applied to the filter circuitry, such that the samples for the IIR filter are interleaved with the samples for the FIR filter. The sparse controller 320, provides samples to the multiply accumulate circuitry 314 such that FIR samples are provided during one half-sample interval and IIR samples during the next half-sample interval. Alternatively, the RAM 310 may be configured as two circular buffers such that FIR samples are written into one buffer and IIR samples are written into the other buffer.

Although, using the optional multiplexer 326 and optional connection 328, the symbol RAM 310 may be used for both the FIR filter 216 and the IIR filter 230, it is contemplated that the circuitry shown in FIG. 3 may be used to implement just the FIR filter 216 and the IIR filter may be implemented separately by duplicating the symbol RAM 310, coefficient RAM 316, coefficient counter 322, multiply accumulate circuit 314 and sparse controller 320. In this alternative embodiment, the symbol RAM and multiply accumulate circuit would be in the feedback path from the derotator/rerotator circuit 318 to the symbol RAM 310.

The coefficient positions of the index set are updated by the sparse controller which receives timing signals from the interval controller 324. The adaptation of the index set is summarized by the flow chart in FIG. 4. The exemplary adaptation algorithm updates M (M≦N) equalizer coefficients of a length-N tapped delay line. The M elements in index set are initialized at step 410. The M coefficients in the index set may be initialized by a variety of methods; contiguously, in blocks of contiguous taps, etc. The index set is adapted every $L^{th}$ baud instance. The baud instances are counted at step 412. Next at step 414, the process compares a measure (for example, magnitude, $l_p$-norm, real/imaginary part, etc.) of each of the M taps to a pre-determined threshold, ϵ and extracts P taps of the M taps to be updated. The P coefficients having a measure that is less than ϵ are referred to as legacy coefficients. The P legacy coefficients are then subject to a second threshold, δ. If the measure of these coefficients is less than or equal to δ, these taps are zeroed. Otherwise, these legacy taps remain fixed at their current value and can be used in the filtering operation but not updated. As used with reference to this algorithm, the term "less than" means less than in accordance with any measure, as described in a text by R. Bartle entitled *Elements of Integration and Lebesque Measure* John Wiley & Sons, New York, 1995, which is incorporated herein by reference for its teachings on measurement theory.

If, at step 416, P is equal to zero, that is to say there are no legacy coefficients having measures that are less than ϵ, P is set to one by designating the smallest tap according to the given measure as the sole legacy coefficient. If P is not equal to zero at step 416, then, at step 420, the process compares the P extracted taps to δ. If a particular one of the P taps is less than δ then, at step 424, the process zeros the tap and removes the corresponding positions from the old index set. If the tap coefficient is greater than or equal to δ, the tap coefficient value is fixed at its current value, the tap is removed from the old index set and step 422 is executed.

At step 426, the P empty positions of the legacy coefficients in the index set are filled from the N-M empty positions in the tapped delay line; starting at the largest index in the index set, and circularly rippling through the tapped delay line, always looking towards increasing delay and starting at the beginning of the tapped delay line when the end of the tapped delay line is reached. The first P empty positions encountered are selected and placed into the new index set. After either step 422 or 424, the index set is updated with the new tap positions at step 426. In this way, the entire length N tapped delay line is updated, M taps at a time.

The threshold parameters, ϵ and δ, and the update rate L can be used to tune the algorithm for certain signaling mediums. For example, if ϵ is set to zero, P automatically defaults to zero and then is set to one, thus, only one legacy coefficient is removed and replaced from the index set during each iteration. Similarly, setting δ to ∞ forces all the legacy coefficients to be set to zero when they are removed from the index set. On the other hand, setting δ to zero causes the legacy taps to be fixed at their current value when they are removed from the index set.

Figure 4:
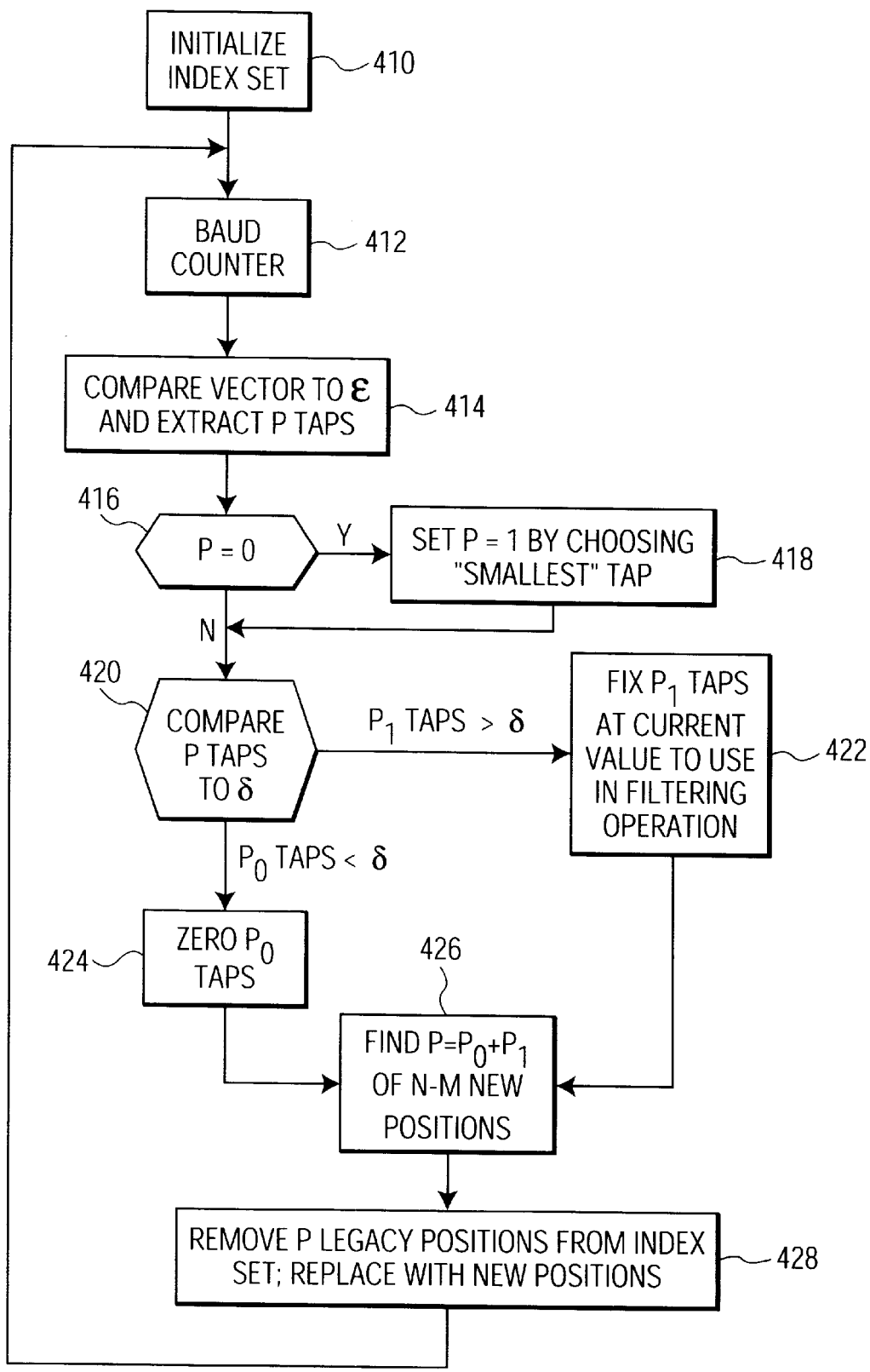
FIG. 4 is a flow-chart diagram which is useful for describing a method by which the coefficients of the filter circuitry shown in FIG. 3 are updated.
Figure 5:
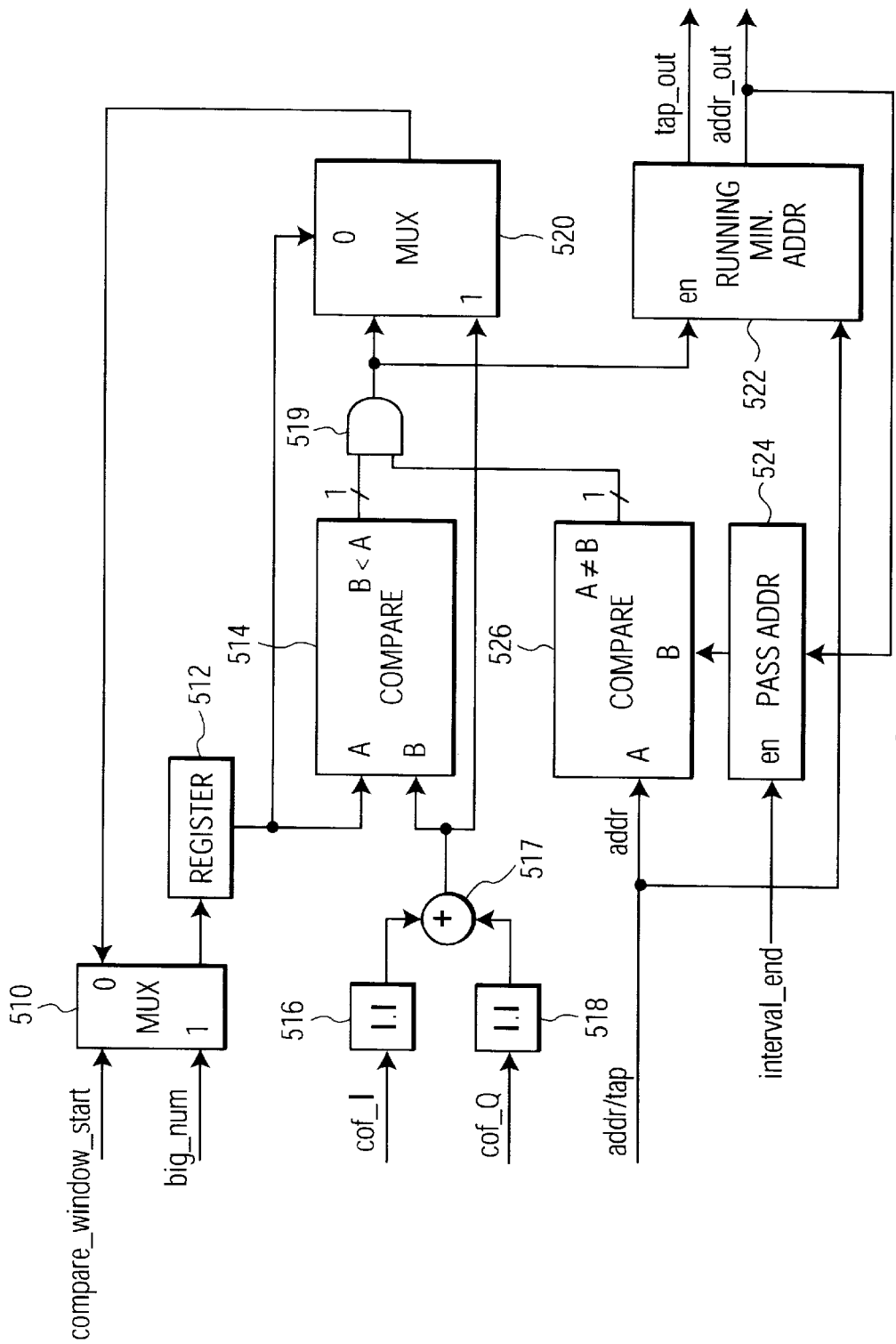
Figure 6:
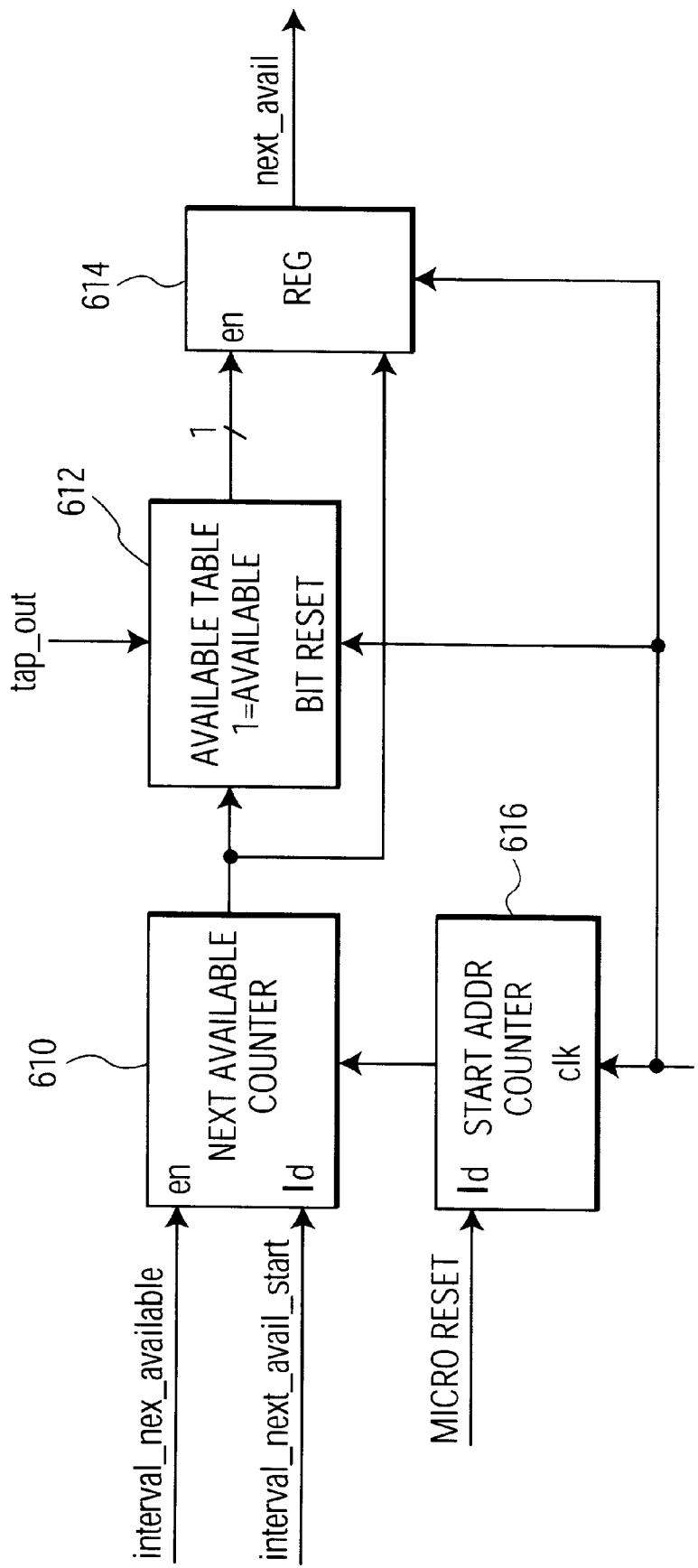

FIGS. 5, 6 and 7 show exemplary circuitry which may be used to implement the process shown in FIG. 4. The exemplary equalizer selects P=1 legacy tap to be updated during each update interval. This tap is zeroed when it is removed from the index set by setting ϵ=0 and δ=∞. These figures show details of the sparse controller 320, of FIG. 3. As described below, as the equalizer is running, the coefficients in the index set are continually updated to change the characteristic applied by the filter in order to compensate for the changing characteristic of the channel. In the exemplary embodiment of the invention, the filter is updated for 1024 sample intervals between updates of the index set. The exemplary filter described with reference to FIGS. 5, 6 and 7 uses a 256 tap delay line that is used to implement both the FIR and IIR filter sections with 32 of the taps being included in the index set. In the exemplary embodiment of the invention, only one coefficient in the index set is changed on each iteration.

The circuitry shown in FIG. 5 identifies the single legacy coefficient in the current index set as the smallest coefficient in $l_1$-norm. The measure $l_1$-norm is defined as $|x|$ for a real signal z=x and as $|x|+|y|$ for a complex signal z=x+jy. The operations performed by the circuitry shown in FIG. 5 begin 32 symbol periods before the end of the 1024 sample filter update interval. This time (1023−32=991 symbol periods into the update interval) corresponds to a pulse signal, compare_window_start. On the occurrence of this signal, an initial value big_num is passed by the multiplexer 510 and stored into the register 512. The value big_num may be, for example, one more than twice the largest binary value that can be represented in the number of bits reserved to hold the coefficient values. If for example, the coefficient values were defined to be 8-bit signed twos-complement values, big_num may be 255.

On the next sample interval after compare_window_start, the first coefficient value in the current index set is applied to the absolute value circuits 516 and 518. Because the filters are complex filters, each coefficient value includes both an in-phase (I) value and a quadrature phase (Q) value. The absolute value circuits 516 and 518 provide the magnitudes of the respective I and Q components of the coefficient value to an adder 517. The adder 517 provides the sum of the magnitudes of the I and Q components to the B input port of a comparator 514 and to one signal input port of a multiplexer 520. The A input port of the comparator 514 receives the coefficient magnitude value that is currently stored in the register 512. This value is also applied to the other signal input port of the multiplexer 520. The output port of the comparator 514 is applied to one input terminal of an AND gate 519. The other input terminal of the AND gate 519 is coupled to receive the output signal provided by a second comparator 526. The operation of this comparator is described below.

When the output signal of the comparator 526 is logic-high and the coefficient magnitude value applied to the B input port of the comparator 514 is less than the value in the register 512, which is applied to the A input port of the comparator 514, the output signal of the comparator 514 is logic-high. This causes the output signal of the AND gate 519 to be logic-high. The signal provided by the AND gate 519 is applied to the control input terminal of the multiplexer 520. A logic-high value applied to the control input terminal causes the current coefficient magnitude value to be stored into the register 512 while a logic-low value applied to this input terminal causes the current value held by the register 512 to be stored into the register again.

In operation, as the described circuitry steps through each of the 32 coefficients in the index set, it stores the smallest coefficient value in the register 512. Because $\epsilon=0$ and $\delta=\infty$, the circuitry shown in FIG. 5 is not concerned with the value of this coefficient, only with its relative value among the coefficients in the tapped delay line. The more important information is the location or coefficient number in the index set of this smallest coefficient value. This information is obtained by the comparator 526 and registers 522 and 524.

The address of the current coefficient value and corresponding tap number are provided by the coefficient RAM 316. The coefficient address is applied to the comparator 526 which compares it to the coefficient address which was designated as the new coefficient address in the index set during the last update of the index set. This comparison is performed to pass over the newest coefficient in the index set, allowing it to be updated during at least 2016 symbol intervals before it again becomes a candidate to be replaced. Thus, the address of the coefficient value that was selected during the last update of the index set is known as the pass address. While the address of the current coefficient value is not equal to the pass address, the comparator 526 provides a logic-high output signal to the AND gate 519.

The current coefficient address value and the corresponding tap number are applied to the data input port of register 522 and the output signal of the AND gate 519 is applied to the enable input terminal of the register 522. Thus, when the current coefficient magnitude value is stored into the register 512, the address of that coefficient value and the corresponding tap number are stored into the register 522. As a result, at the end of the 32 symbol interval for updating the index set, the register 522 provides the address, in the coefficient RAM 316, of the smallest coefficient value in the index set as the signal addr_out and the corresponding tap position to which it was assigned as the signal tap_out. Also at the end of this interval, the interval controller 324 (shown in FIG. 3) asserts the interval_end signal to store this address of the smallest coefficient value into the register 524. Thus, the address of the smallest coefficient value identified during the current coefficient set update interval becomes the pass address for the next coefficient set update interval.

FIG. 6 shows circuitry in the sparse controller 320 which selects a new tap in the delay line that is to be assigned to the coefficient address that was identified by the circuitry shown in FIG. 5. The circuitry shown in FIG. 6 employs a 256-bit memory 612, having one bit for each possible tap of the filter delay line, to indicate which taps do not have coefficients and are therefore empty. As described above, the filter delay line is implemented by the coefficient RAM 316 of FIG. 3, so the "taps" correspond to the different cells in the RAM. In the exemplary embodiment of the invention, all of the bits in the available table 612, except for the first 32, are initially set to logic-high. The first 32 bits are reset to indicate the starting tap positions of the coefficients in the index set. The search for the next tap position begins 256 symbol periods before the end of the 1024 sample filter update interval. This time (1023−256=767 symbol periods into the update interval) corresponds to the signal interval_next_available_start. The signal interval_next_available has a logic-high value for the entire 256 symbol periods during which the search for the next available tap is performed and is logic-low otherwise.

At the start of the interval, the counter 610 is initialized to the value held in the start address counter 616 and the bit corresponding to the tap number tap_out is set. As described above with reference to FIG. 5, this tap had previously been assigned to a coefficient but, because the coefficient value was smaller than any other coefficient value, it was dropped from the index set. Accordingly, the coefficient address may now be associated with another tap and, by the same token, the tap may be associated with another coefficient. Alternatively, it is contemplated that once a tap has been selected it may not again be made available. In this alternative embodiment, once each of the taps has been tried as a sparse filter tap it is not tried again.

The start address counter 616 is incremented by one for each 1024 symbol period filter update interval. The first time that the available table is searched, the counter 616 is set to 32 by the microprocessor (not shown) via the micro_reset circuit. At each symbol period of the 256 symbol tap search interval, the counter 610 is incremented by one to point to the next entry in the available table. When an available table entry having a logic-high value is encountered, the register 614 is enabled to store the tap address. After an available tap has been found, the counter 610 continues to increment and available tap addresses farther along on the tapped delay line replace the tap address stored in the register 614. Counter 610 is a circular counter as it begins again at zero after reaching a count value of 255. Thus, at the end of the tap search interval, marked by the signal interval_end, the register 614 provides the tap address of the last available tap before the start address provided by the register 616 as the signal next_avail. Thus, in this exemplary embodiment of the invention, the process of selecting the next available tap precesses around the delay line from the position pointed to by the start address value. The signal interval_end stops the counter 610, gates the currently stored value from the register 614 and resets the corresponding bit in the available table to mark the tap as no longer being available.

The circuitry shown in FIGS. 5 and 6 operates in parallel. Thus, at the end of a 1024 symbol period filter update interval, the circuitry shown in FIG. 5 provides the signal addr_out which indicates the address in the coefficient RAM 316 of the legacy tap which is to be removed from the index set and the circuitry shown in FIG. 6 provides the signal next_avail indicating the replacement for the address in the coefficient RAM 316. FIG. 7 shows an indirect address table 710 which is used to hold the tap address for each of the 32 coefficients in the index set. For each symbol period in the filter update interval, this filter provides 32 address values, as the signal sparse_addr, to the symbol RAM 310, for the 32 taps in the delay line which are passed to the multiply accumulator 314 (shown in FIG. 3). These 32 sample values are multiplied by their corresponding coefficient values and accumulated to generate an output sample value. At the end of a filter update interval, the tap assignment of the coefficient indicated by the signal addr_out is changed to the tap indicated by the signal next_avail. This occurs when the signal addr_out is applied to the write address input port of the RAM 710 and the signal next_avail is applied to the write data input port of the RAM 710.

The adaptive sparse updating algorithm applies 32 I/Q samples to the coefficient RAM as a part of the coefficient update process. The 32 I/Q samples are not necessarily the same as the 32 I/Q samples that are applied to the multiply-accumulator 314. If, for example, at a given baud instance, k, I/Q(k) is applied to the multiply-accumulator 314, then I/Q(k+Δ) is applied to the coefficient update process. The delay, Δ, typically is one or two baud instances depending on the delay involved in generating the I/Q error relative to the vector of I/Q samples from which it was derived. The values I/Q(k) and I/Q(k+Δ) may be accessed concurrently from a single memory, such as a dual-port RAM.

The circuitry shown in FIG. 7 also includes a multiplexer 712 which is controlled by the signal preset. When preset is asserted, the tap location is provided by the microprocessor (not shown) as the signal micro_data. This allows the microprocessor to preset which taps correspond to which coefficients. In the exemplary embodiment of the invention, this mechanism is used initially to assign the 32 coefficients to the first 32 taps in the delay line. It is contemplated, however, that other assignments may be used. For example, if this were the second or subsequent time that the equalization filter is being initialized, the taps assigned by the microprocessor may be the final tap assignments that were determined when the filter was previously initialized.

FIG. 8A is a block diagram of an exemplary multiply/accumulate circuitry 314 shown in FIG. 3 and FIG. 8B is a table providing timing information for the signals mux_con and clear shown in FIG. 8A. As shown in FIG. 8A, the signals sym_I and sym_Q provided by the symbol RAM 310 are applied to one input port of the respective multipliers 810 and 812 while the coefficient values from the coefficient RAM 316 are applied to the other input port. The output values from the multiplier 810 are applied to the 1 input port of the multiplexer 814 and the 0 input port of the multiplexer 816 while the output values of the multiplier 812 are applied to the 1 input port of the multiplexer 816 and the 0 input port of the multiplexer 814. The output values provided by the multiplexers 816 and 814 are applied to the respective accumulators 818 and 820.

When the signal being equalized is a VSB signal, the symbol period is one-half of the symbol period when a QAM signal is being equalized. In addition, for derotated VSB signals, all of the symbol information is contained in the I component, so partial sample values involving the Q component may be ignored. The Q component is important, however, for modulation information, as described below with reference to FIG. 9. In VSB mode, only I coefficients are provided as set forth in equations (4) and (5) above. The signal mux_con is held at logic-high in VSB mode so that successive values of the signal sym_I are multiplied by the I coefficient values and provided by the multiplexer 814 to the accumulator 818 and successive values of the signal sym_Q are multiplied by the I coefficient values and provided to the accumulator 820. The output values of the accumulators 818 and 820 are provided at the end of the accumulation periods. For VSB signals, output values are provided at T/2 intervals, where T is the symbol time of an otherwise equivalent QAM signal.

In QAM mode, however, the multiply accumulator operates as a full complex multiplier. The coefficient values are provided as sequential I and Q components at twice the rate at which the signals sym_I and sym_Q are provided and 32 values for sym_I and sym_Q are provided during each symbol clock interval. Thus multiplier 810 sequentially provides I and Q partial values while multiplier 812 sequentially provides Q and −I partial values. The control value mux_con of the multiplexers 814 and 816 is toggled as each I or Q coefficient value is provided. Thus, the multiplexer 814 sequentially provides (sym_I*coeff_I), −(sym_Q*coeff_Q), (sym_I*coeff_I), etc. while the multiplexer 816 sequentially provides (sym_Q*coeff_I), (sym_I*coeff_Q), (sym_Q*coeff_I), etc. The successive values are accumulated in the accumulators 818 and 820. In QAM mode, the output samples, eq_out_I and eq_out_Q are provided and the accumulators 818 and 820 are cleared at intervals of T.

FIG. 9 is a block diagram of the derotator/re-rotator 318, shown in FIG. 3. As described above, the derotator/re-rotator operates in two modes to control a phase-locked loop (PLL) which includes a loop filter (not shown) and a numerically controlled oscillator (not shown). Exemplary loop filters and numerically controlled oscillators are disclosed in U.S. Pat. No. 5,588,025 entitled SINGLE OSCILLATOR COMPRESSED DIGITAL INFORMATION RECEIVER and U.S. Pat. No. 5,517,535 entitled NUMERICALLY CONTROLLED OSCILLATOR WITH COMPLEX EXPONENTIAL OUTPUTS USING RECURSION TECHNIQUE which patents are incorporated herein by reference for their teachings on phase locked loops.

The circuitry shown in FIG. 9 operates in CMA mode and DD mode, for each of the VSB and QAM signal processing modes. The constant modulus algorithm (CMA) mode is used for initial signal acquisition and then the circuit is switched to a decision directed (DD) mode to allow the equalizer to track the acquired signal. The operation of the circuit is described first for processing VSB signals and then for processing QAM signals.

When a VSB signal is processed, the multiplexer control signal, mux_con is held logic-low. In this mode, multiplexer 914 provides the recovered carrier signal, cos, to the multiplier 910 while multiplexer 916 provides the phase shifted recovered carrier signal, sin, to the multiplier 912. Multiplier 910 forms the product of the signal cos and the signal eq_out_I provided by the multiply/accumulator 314, described above. In the same way, the multiplier 912 forms the product of the signal sin and the signal eq_out_Q provided by the multiply/accumulator 314. The output signal of the multiplier 912 is subtracted from the output signal of the multiplier 910 in the subtracter 918 to provide a derotated I signal, I_derot. The signal provided by the multiplier 912 is summed with the signal provided by the multiplier 910 in the adder 920 to provide the signal Q_derot. In VSB mode, Q_derot is ignored and need not be calculated, I_derot is calculated at twice the rate that I_derot is calculated when the equalizer is in QAM mode.

The signal I_derot is applied to a subtracter 922 which subtracts the pilot component from the VSB signal. The pilot signal is a constant value provided by the DC pilot removal register 924. When QAM signals are processed, register 924 provides a value of zero so the subtracter 922 does not affect QAM signals. Next, the output signal of the subtracter 922 is applied to one input port of a multiplexer 928 which implements a frequency shift by $-F_S/4$. The output signal of the subtracter 922 is also applied to a slicer 930 which converts the signals I_derot and Q_derot of the QAM signal or the signal I_derot of the VSB signal into symbol estimates. Exemplary QAM slicers are described in the above-referenced text by M. Simon et al. The output signals of the slicer 930 are applied to a $-F_S/4$ multiplexer 929. The output signals of the multiplexers 928 and 929 are applied to a phase detector 932.

As an alternative to multiplying the VSB signal by $F_S/4$ to convert it into a SQAM signal so that a single QAM slicer may be used for the slicer 930, it is contemplated that separate VSB and QAM slicers (not shown) may be used and a multiplexer (not shown) may direct the samples to the VSB slicer when VSB signals are being processed and direct the samples to the QAM slicer when QAM signals are being processed. Exemplary VSB slicers are described below with reference to FIGS. 13 and 14.

Details of the multiplexers 928 and 929 are shown in FIG. 9A. In FIG. 9A, the derotated I signal from the subtracter 922 is applied directly to a first input port of the multiplexer 950 and inverted and applied to a second input port of the multiplexer. The multiplexer 950 receives a $2F_S$ clock signal and the VSB/QAM control signal. The signal Q_derot is applied to a third input port of the multiplexer. When the equalizer is operating in QAM mode, the I and Q signals are alternately passed, at the $2F_S$ clock rate directly from the I and Q input ports to the output port of the multiplexer; the inverted I signal is ignored. When the equalizer is operating in VSB mode, however, the multiplexer 923 is conditioned to pass a zero value from the digital value source 921 to the Q input port of the multiplexer 950 and the multiplexer 950 is conditioned to cycle between the zero-valued Q input port and the I and inverted I input ports to provide the output signal. When a VSB signal is being processed, the multiplexer 950 implements a $-F_S/4$ frequency shift by effectively multiplying the VSB signal by 1, 0, −1, 0, 1, 0, . . . As described in the above referenced article by Gitlin et al., this frequency shift converts the VSB signal into a staggered QAM signal.

The output samples provided by the multiplexers 928 and 929 are applied to a QAM phase detector 932 which uses the difference between these values as an indication of phase error when the loop is being operated in decision directed (DD) mode during phase tracking. When the equalizer is operating in VSB mode, the QAM phase detector operates on the SQAM I/Q pairs generated by the $-F_S/4$ multiplexers as I(0)/Q(1), I(2)/Q(1), I(2)/Q(3) . . . and generates a phase estimate at the VSB baud rate.

The signals I_derot and Q_derot are also applied to a CMA error term circuit 926 which is described below with reference to FIG. 10. The output signal of the circuit 926, cma_error_bb is the complex-valued CMA baseband error term when the carrier is locked. The signal cma_error_bb has only I terms for VSB signals but has both I and Q terms for QAM signals.

The difference between the input and output signals of the slicer 930 is the baseband decision-directed error term when the equalizer is in tracking mode. This second value is calculated by the subtracter 940 and provided to one signal input port of the multiplexer 942. The signal cma_error_bb is applied to the other signal input port of the multiplexer 942. The multiplexer 942 provides a complex baseband error signal, I/Q_err_bb, which for VSB has only I terms but for QAM has both I and Q terms. This multiplexer is controlled by the signal dfe/fb_con to provide the signal cma_error_bb if the equalizer is operating in CMA mode and to provide the output signal of the subtracter 940 if the equalizer is operating in DD mode. In the same way, the multiplexer 934, which provides the current approximation of the demodulated symbols, is controlled by the signal dfe/fb_con to provide the input signal to the slicer 930 when the equalizer is operating in CMA mode and the output signal of the slicer 930 when the equalizer is operating in DD mode.

The I component of the VSB output signal of the multiplexer 934 has the pilot signal reinserted by the adder 936. The adder 936 compensates for the removal of the pilot signal by the subtracter 922, described above. As with the subtracter 922, when a QAM signal is processed, a value of zero is added to the I component by the adder 936. Thus, the adder 936 does not affect QAM signals. The Q component provided by multiplexer 934 is zero when VSB signals are processed and is the sliced Q component when QAM signals are processed. The output signal of the adder 936 is the I signal at baseband. The output signals provided by the multiplexer 934 are applied to a rerotator 944, which inverts the operation performed by the derotator 900.

The I and Q input signals to the slicer 930 are subtracted from the respective I and Q output signals of the slicer in the subtracter 940. The complex output signal of the subtracter 940, which represents the baseband DD error term, is applied to one input port of the multiplexer 942. The output signal of the multiplexer 942, I/Q_err_bb, is also applied to the re-rotator 944. The re-rotator 944 also receives the sin and cos signals from the carrier loop. The re-rotator 944 remodulates the I and Q signals and also modulates the signal I/Q_err_bb.

The output signals of the re-rotator 944 are sym_IQ_pb, the remodulated symbol signal, and I/Q_err_pb, the remodulated error signal as determined in either CMA or DD mode. With reference to FIG. 2A, the derotator 900 corresponds to derotator 222 and re-rotator 944 corresponds to rerotator 226. The slicer 930 corresponds to the slicer 224, shown in FIG. 2A.

In the circuitry shown in FIG. 9, the pilot signal is subtracted for better performance in DD mode and added back before the signal is rerotated. If this pilot signal were not reinserted, its absence may contribute to the error terms determined for the IIR filter.

Figure 10:
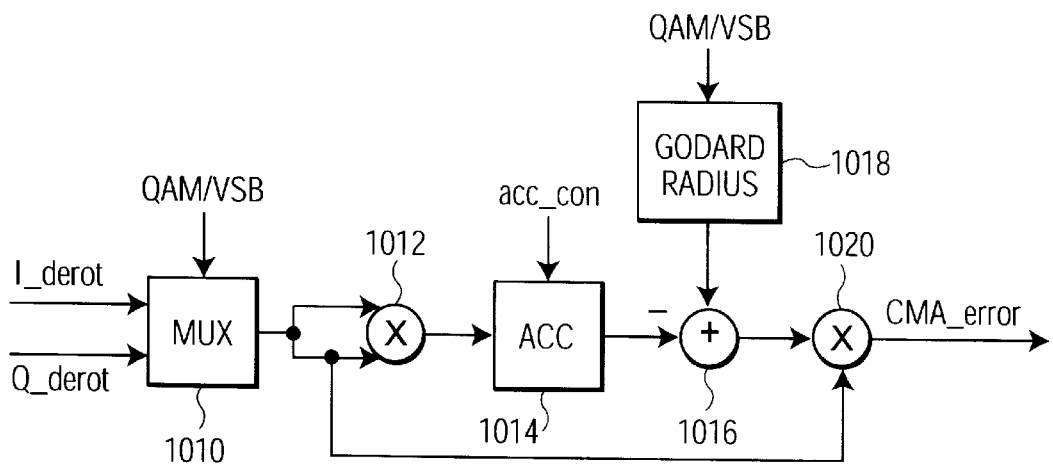
FIG. 10 is a block diagram of CMA error circuitry suitable for use with the derotator/rerotator circuitry shown in FIG. 9.

FIG. 10 is a block diagram of the CMA error term circuitry 926 shown in FIG. 9. The derotated I and Q signals, I_derot and Q_derot, provided by the derotator 900 are applied to the data input ports of a multiplexer 1010. The control input terminal of the multiplexer 1010 receives the signal QAM/VSB. In QAM mode, the control signal to the multiplexer 1010 causes I_derot and Q_derot to alternately be provided to the squaring multiplier 1012. In VSB mode, only the I_derot signal is provided. The circuitry including the squaring multiplier 1012, accumulator 1014, subtracter 1016, register 1018 and multiplier 1020 implement equation (1) above. The squaring multiplier squares the input sample value to generate the $|z_k|^2$ terms of equation 1. For QAM processing, the I and Q signals are provided sequentially and accumulated in the accumulator 1014. For VSB, the accumulator 1014 passes the sample without modification. The subtracter 1016 subtracts $|z_k|^2$ from the dispersion constant, γ, which is provided by the register 1018, and the multiplier 1020 multiplies the result of the subtraction by $z_k$. The value of γ depends on the signal alphabet as described in the above referenced articles by Godard and Treichler et al.

The present invention uses CMA for acquisition for both QAM and VSB. The QAM acquisition algorithm is along two axes in that the CMA error term is appended to both I and Q equalizer coefficients. The VSB acquisition algorithm, however, is a single-axis algorithm because only I equalizer coefficients are used. The inventors have determined that this single-axis CMA is superior to other blind schemes for acquiring VSB signals. The signal CMA_error is provided to the multiplexer 942 as described above with reference to FIG. 9.

Figure 11:
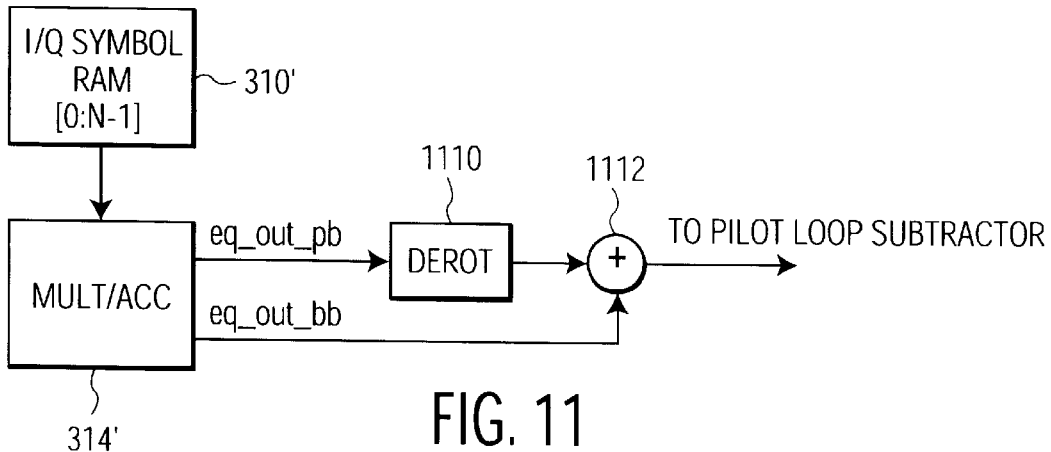
FIG. 11 is a block diagram of circuitry which may be substituted into the filter circuitry shown in FIG. 3 to implement an alternative sparse equalizer filter.

FIG. 11 is a partial block diagram which illustrates another exemplary embodiment of the invention. The embodiment relates to FIGS. 3 and 9, described above. This alternative embodiment has a symbol RAM 310' which includes both the FIR and IIR delay lines. The output signal of the symbol RAM 310' includes both baseband and passband components. The multiply/accumulator 314' of this alternative embodiment provides the baseband output signal eq_out_bb and the passband output signal eq_out_ pb concurrently. The passband output signal is applied to a derotator 1110 which converts the signal to baseband and is then added to the signal eq_out_bb in the adder 1112. This signal is applied to the pilot loop subtracter 922 shown in FIG. 9.

The design of the slicer or quantizer for a VSB tracking loop is problematical. When the receiver is switched into tracking mode, the slicer is used to quantize the signal. The regressor vector for the IIR section and the DD error term are both created from this quantized signal. For QAM signaling, the quantizer may be a standard nearest-element decision device. For VSB signaling, however, the threshold of visibility (TOV) according to the above-referenced ATSC standard translates roughly to a two in ten symbol error rate for the 8-VSB stream before trellis decoding. It is widely accepted in the adaptive signal processing community that a good rule of thumb to guarantee convergence of DD-LMS using a standard nearest-element decision device is to have better than one in ten symbol errors. Thus, an intelligent quantizer is desirable for a robust VSB receiver. An exemplary quantizer suitable for use in the present invention is described in a U.S. patent application entitled SMART SLICER FOR COMBINED TRELLIS DECODING AND EQUALIZATION, filed on even date herewith, and incorporated herein by reference for its teaching on decoding and quantizing channel impaired trellis coded signals.

Figure 12:
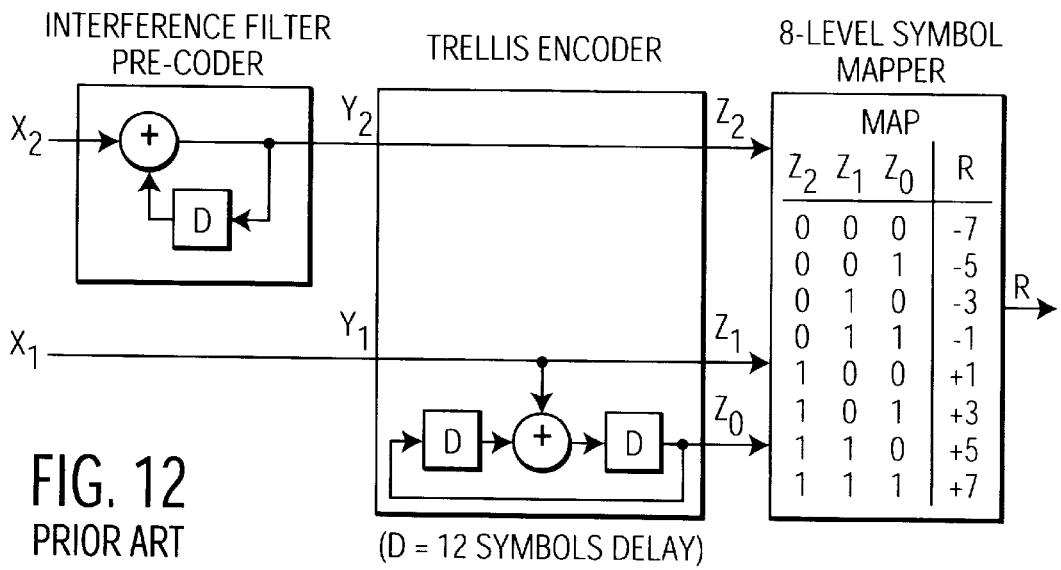
FIG. 12 (prior art) is a block diagram of an exemplary trellis encoder as specified for digital television signals in the standard specified by the Advanced Television System Committee (ATSC).

The exemplary receiver, when processing VSB signals, performs joint equalization and decoding functions in order to provide robust demodulation of HDTV signals. The quantizer exploits the nature of the trellis coding by replacing the standard nearest-element decision device with one that processes one stage of the trellis decoder in order to estimate one or two bits of the three-bit symbol. See FIG. 12, which is reproduced from pp. 51 of the above-referenced ATSC standard. FIG. 12 shows the 8-VSB trellis encoder and the bits-to-symbol mapper.

Figure 13:
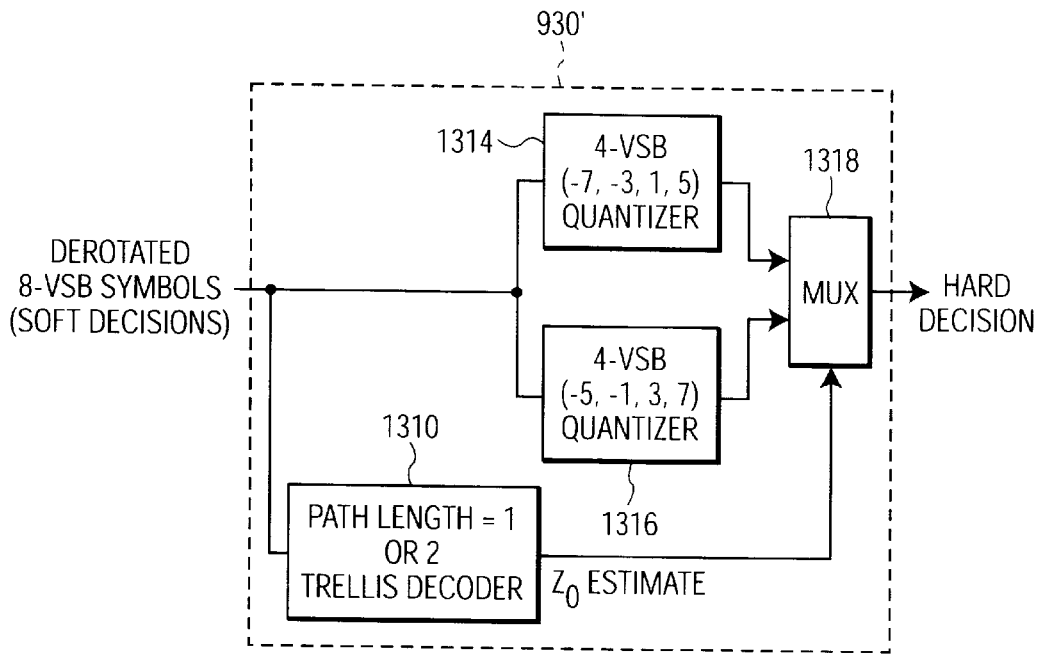
FIG. 13 is a block diagram of a first exemplary symbol slicer which may be used in the derotator/rerotator circuitry shown in FIG. 9.
Figure 14:
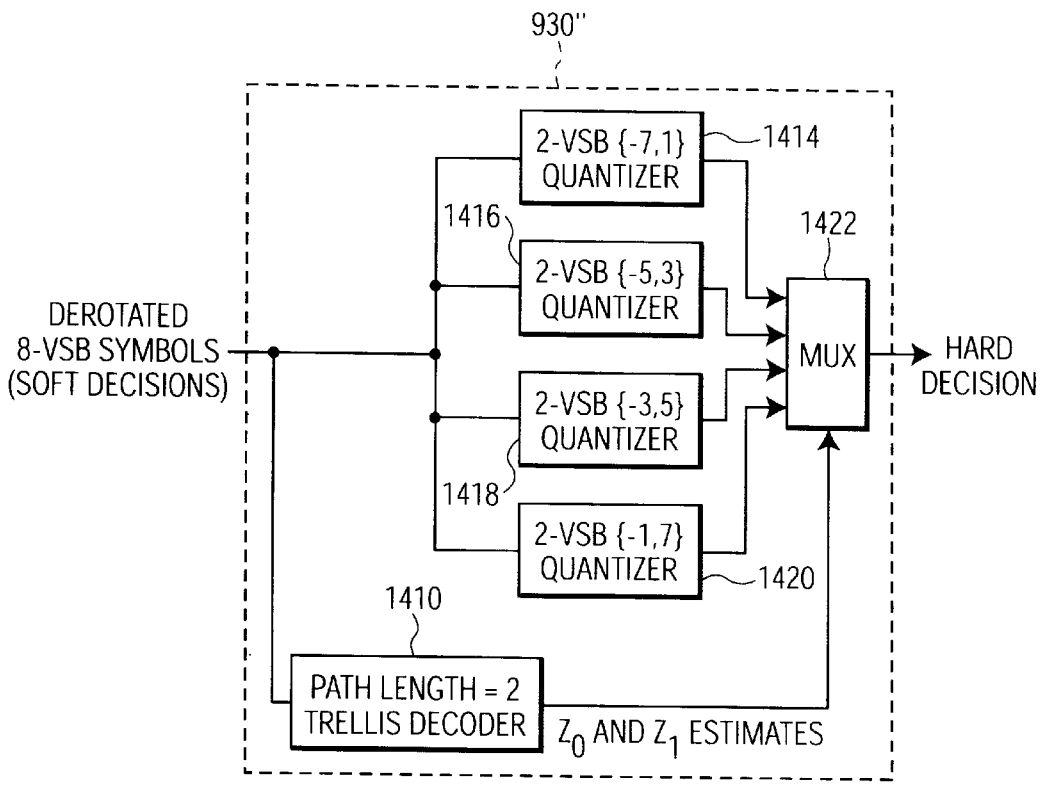
FIG. 14 is a block diagram of a second exemplary symbol slicer which may be used in the derotator/rerotator circuitry shown in FIG. 9.

The optional quantizers shown in FIGS. 13 and 14 replace the quantizer 930 shown in FIG. 9 when the system processes VSB signals. A first optional implementation estimates a single bit, Z0, of the three bit symbol. FIG. 13 shows an exemplary implementation when bit Z0 is known, as shown, in this implementation, the 8-VSB constellation may be decomposed into the disjoint union of two 4-VSB constellations. In this exemplary embodiment, a trellis decoder having a path length of 2 may be used to estimate the $Z_0$ bit that is used to control the slicer. For example, the 8-VSB constellation can be decomposed as set forth in equation (6)

$$8\text{-VSB}=\{-7,-3,1,5\}\cup\{-5,-1,3,7\} \quad (6)$$

where the first 4-VSB subset, (quantizer 1314) corresponds to $Z_0=0$ and the second 4-VSB subset (quantizer 1316) corresponds to $Z_0=1$, respectively. A demultiplexer 1318 combines the output samples provided by the quantizers 1314 and 1316 into a single data stream and appends the appropriate $Z_0$ value to each quantized symbol.

The exemplary quantizer for 8-VSB signaling provides an estimate of $Z_0$ (from the path length 2 trellis decoder) and is therefore referred to as a "smart slicer." Based on this bit-estimate, the symbol is quantized from one of the two 4-VSB subsets. The symbol error rate for 4-VSB at the SNR corresponding to the TOV is well below the rule of thumb of one in ten. Hence, the smart-slicer can provide reliable symbol quantization for decision-directed operation even at the TOV.

The inventors have found that a delayed $Z_0$ from a simpler path-length=1 trellis decoder also performs very well. This method has the advantage that the delayed $Z_0$ was previously computed (12 symbols earlier in the sequence), whereas, for the path-length=2 decoder, the $Z_0$ bit is both estimated and used by the slicer in one VSB symbol period.

The second option is shown in FIG. 14. In this option, the smart slicer recognizes that the bits $Z_0$ and $Z_1$ are related in the trellis encoder (see FIG. 12 above), so that an estimate of $Z_1$ can be derived from current and past estimates of $Z_0$. In this case, the 8-VSB constellation can be decomposed into a disjoint union of four 2-VSB subsets as set forth in equation (7).

$$8\text{-VSB}=\{-7,1\}\cup\{-5,3\}\cup\{-3,5\}\cup\{-1,7\} \quad (7)$$

where the four 2-VSB subsets correspond to $(Z_0, Z_1)$ bit pairs (0,0), (0,1), (1,0), and (1,1), respectively. This alternative embodiment is shown in FIG. 14, where the single stage trellis 1410 generates estimates of $Z_0$ and $Z_1$ and applies these estimates as the control signals to a multiplexer 1412. The multiplexer 1412 divides the symbols among the quantizers 1414, 1416, 1418 and 1420 according to the values of $Z_0$ and $Z_1$. These quantizers decode the final bit of the symbol value and the demultiplexer 1422 combines the output symbols provided by the quantizers 1414 through 1420 into a single data stream and appends the previously determined values for $Z_0$ and $Z_1$.

For both options the smart slicers quantize the symbol with a symbol error rate at the SNR corresponding to a TOV which is well below the rule of thumb of one in ten. Hence, the smart-slicer can provide reliable symbol quantization for decision-directed operation even at the TOV for 8-VSB, facilitating superior equalization and phase noise performance.

Although the invention has been described in terms of exemplary embodiments, it is contemplated that it may be practiced as outlined above within the scope of the appended claims.

What is claimed:

1. A transmission channel equalizer comprising:

a sparse digital filter having N tap positions and M coefficients, where N and M are integers and N is greater than M which is greater than 2;

means for adaptively selecting M of the N tap positions and for assigning the M coefficients to the selected M tap positions; and means for adaptively updating the selected M coefficients both in value and in correspondence to tap positions in the sparse digital filter;

wherein the means for adaptively selecting M of the N tap positions includes:

means for identifying a plurality of tap positions having corresponding coefficient values that are less than a threshold value, $\epsilon$;

means for comparing the coefficient values of each of the identified plurality of tap positions to a further threshold value $\delta$;

means for deleting all of the tap positions having a value less than $\delta$ from the M tap positions; and means for selecting one tap position for each deleted tap position to provide M selected tap positions.

2. A transmission channel equalizer according to claim 1, wherein:

the means for identifying a plurality of tap positions having corresponding coefficient values that are less than $\epsilon$, compares the coefficient values to $\epsilon$ according to any arbitrary measure; and the means for comparing each of the identified plurality of tap positions to δ operates in accordance with an arbitrary measure.

3. A transmission channel equalizer according to claim 1, wherein:
   the sparse digital filter includes a plurality of sections, each section including a subset of the N taps and each having a subset of the M coefficients;
   the means for adaptively selecting the M tap positions, independently adaptively selects the respective subset of the M coefficients for each filter section; and
   the means for adaptively updating the selected M coefficients independently updates the respective subset of the M coefficients for each filter section.

4. A transmission channel equalizer according to claim 1, wherein the means for selecting one tap position for each deleted tap position selects only tap positions which do not have a corresponding coefficient value.

5. A transmission channel equalizer according to claim 1, wherein the means for selecting one tap position for each deleted tap position selects only tap positions which have not previously been assigned a coefficient value.

6. A transmission channel equalizer comprising:
   a sparse digital filter having N tap positions and M coefficients, where N and M are integers and N is greater than M which is greater than 2;
   means for adaptively selecting M of the N tap positions and for assigning the M coefficients to the selected M tap positions; and
   means for adaptively updating the selected M coefficients both in value and in correspondence to tap positions in the sparse digital filter;
   wherein the means for adaptively selecting M of the N tap positions includes:
   means for identifying a plurality of tap positions having corresponding coefficient values that are less than a threshold value, ε, according to an $l_1$-norm measure of the coefficient values;
   means for comparing the coefficients of each of the identified tap positions to a further threshold value δ, according to the $l_1$-norm measure of the coefficients;
   means for deleting, from the M tap positions, all of the tap positions corresponding to the coefficients which have a value less than δ; and
   means for selecting one tap position for each deleted tap position to provide M selected tap positions.

7. A transmission channel equalizer comprising:
   a sparse digital filter having N tap positions and M coefficients, where N and M are integers and N is greater than M which is greater than 2;
   means for adaptively selecting M of the N tap positions and for assigning the M coefficients to the selected M tap positions; and
   means for adaptively updating the selected M coefficients both in value and in correspondence to tap positions in the sparse digital filter;
   wherein the means for adaptively selecting M of the N tap positions includes:
   means for identifying one of the M tap positions which has a corresponding coefficient value that is less than any other coefficient value;
   means for deleting the identified tap position from the M tap positions; and
   means for selecting one tap position of the N tap positions which is not associated with a coefficient value and for adding the selected tap position to the M tap positions.

8. A transmission channel equalizer according to claim 6 or 7, wherein the means for adaptively updating the selected M coefficients adapts the coefficients independent of any training signal.

9. A transmission channel equalizer according to claim 6 or 7, wherein the means for adaptively updating the selected M coefficients adapts the coefficients according to a decision directed update algorithm.

10. A transmission channel equalizer according to claim 6 or 7, wherein the means for adaptively updating the selected M coefficients using an update algorithm selected from a group consisting of a constant modulus algorithm and a single axis constant modulus algorithm.

11. A transmission channel equalizer according to claim 6 or 7, wherein the means for adaptively updating the selected M coefficients adapts the coefficients according to a single axis constant modulus algorithm.

12. A transmission channel equalizer according to claim 6 or 7, further including a receiver for receiving either a quadrature amplitude modulated (QAM) signal or a vestigial sideband modulated (VSB) signal and for adapting the equalizer to process the QAM or VSB signal, respectively.

13. A transmission channel equalizer according to claim 6 or 7, wherein the sparse digital filter includes a finite impulse response (FIR) filter and an infinite impulse response (IIR) filter.

14. A transmission channel equalizer according to claim 13, further including:
   a receiver for receiving a channel corrupted radio frequency (RF) encoded digital data signal, wherein the FIR filter is adapted to process the RF encoded digital data signal; and
   a derotator for converting the RF encoded digital data signal into a baseband digital data signal, wherein the IIR filter is adapted to process the baseband digital data signal.

15. A transmission channel equalizer according to claim 13, further including a receiver for receiving a channel corrupted radio frequency (RF) encoded digital data signal, wherein the FIR filter is adapted to process the RF encoded digital data signal to produce a filtered RF output signal and the IIR filter is adapted process the filtered RF output signal.

16. A transmission channel equalizer comprising:
   a sparse digital filter having N tap positions and M coefficients, where N and M are integers and N is greater than M which is greater than 2;
   means for adaptively selecting M of the N tap positions and for assigning the M coefficients to the selected M tap positions; and
   means for adaptively updating the selected M coefficients both in value and in correspondence to tap positions in the sparse digital filter;
   wherein the means for adaptively selecting M of the N tap positions includes:
   means for identifying a plurality of the M tap positions having corresponding coefficient values that are less than the corresponding coefficient values of other ones of the taps in accordance with a predetermined measure;
   means for deleting the identified plurality of tap positions from the M tap positions in accordance with a predetermined measure; and
   means for selecting a plurality of tap positions from the N tap positions, which selected plurality of tap positions are not associated with coefficient values and for adding the selected tap position to the M tap positions.

17. A transmission channel equalizer according to claim 7 or 16, wherein the means for adaptively selecting M of the N tap positions further including means for inhibiting the deletion of the tap position which was most recently selected from the M tap positions.

18. A transmission channel equalizer comprising:

a sparse digital filter having N tap positions and M coefficients, where N and M are integers and N is greater than M which is greater than 2;

means for adaptively selecting M of the N tap positions and for assigning the M coefficients to the selected M tap positions; and means for adaptively updating the selected M coefficients both in value and in correspondence to tap positions in the sparse digital filter;

where the sparse digital filter includes:

a first finite impulse response (FIR) filter which processes modulated channel impaired digital samples to produce filtered modulated channel impaired digital samples; and an infinite impulse response (IIR) filter which processes the filtered modulated channel impaired digital samples, to produce output equalized digital samples, the IIR filter including:

summing means which adds further filtered digital samples to the filtered modulated digital samples to produce the output equalized digital samples; and a second FIR filter which processes the output equalized digital samples to produce the further filtered digital samples.

19. A transmission channel equalizer according to claim 18, wherein the first FIR filter and the IIR filter are responsive to a control signal to processes either quadrature amplitude modulated (QAM) or vestigial sideband modulated (VSB) signals.

20. A transmission channel equalizer according to claims 18 or 19, wherein the means for adaptively updating the selected M coefficients using an update algorithm selected from a group consisting of a constant modulus algorithm and a single axis constant modulus algorithm.

21. A transmission channel equalizer comprising:

a sparse digital filter having N tap positions and M coefficients, where N and M are integers and N is greater than M which is greater than 2;

means for adaptively selecting M of the N tap positions and for assigning the M coefficients to the selected M tap positions; and means for adaptively updating the selected M coefficients both in value and in correspondence to tap positions in the sparse digital filter;

where the sparse digital filter includes:

a first finite impulse response (FIR) filter which processes modulated channel impaired digital samples to produce filtered modulated channel impaired digital samples;

a derotator which mixes the filtered modulated channel impaired digital samples with an estimated carrier signal to produce derotated channel impaired digital samples;

an infinite impulse response (IIR) filter which processes the derotated channel impaired digital samples, to produce output equalized digital samples, the IIR filter including:

summing means which adds filtered derotated digital samples to the derotated channel impaired digital samples to produce the output equalized digital samples; and a second FIR filter which processes the output equalized digital samples to produce the filtered derotated digital samples.

22. A transmission channel equalizer according to claim 21, wherein the first FIR filter and the IIR filter are responsive to a control signal to processes either quadrature amplitude modulated (QAM) or vestigial sideband modulated (VSB) signals.

23. A transmission channel equalizer according to claims 21 or 22, wherein the means for adaptively updating the selected M coefficients uses a constant modulus algorithm.

24. A transmission channel equalizer according to any of claims 18, 19, 21, or 22 wherein each of the first and second FIR filters includes at least one sparse FIR filter section.

25. A transmission channel equalizer according to claim 24, wherein each of the first FIR filter and FIR filter sections includes a subset of the N taps;

the means for adaptively selecting M of the N tap positions independently and adaptively selects a subset of the M tap positions from each of the respective FIR filter and the plurality of FIR filter sections; and the means for adaptively updating the selected M coefficients independently and adaptively updates each of the subsets of the M tap positions for each of the respective FIR filter and the plurality of FIR filter sections.

26. A transmission channel equalizer comprising:

a sparse digital filter having N tap positions and M coefficients, where N and M are integers and N is greater than M which is greater than 2;

means for adaptively selecting M of the N tap positions and for assigning the M coefficients to the selected M tap positions; and means for adaptively updating the selected M coefficients both in value and in correspondence to tap positions in the sparse digital filter;

where the sparse digital filter includes:

a first finite impulse response (FIR) filter which processes modulated digital samples to produce filtered modulated digital samples; and an infinite impulse response (IIR) filter which processes the filtered modulated digital samples, the IIR filter including:

summing means which adds filtered rerotated digital symbols to the filtered modulated digital samples to produce equalized digital samples; and a derotator which mixes the equalized digital samples with an estimated carrier signal to produce derotated digital samples;

a slicer which quantizes the derotated digital samples according to a predetermined alphabet to produce digital symbols;

a rerotator which mixes the digital symbols with the estimated carrier signal to produce rerotated digital symbols; and a second FIR filter which processes the rerotated digital symbols to produce the filtered rerotated digital symbols.

27. A transmission channel equalizer comprising:

a sparse digital filter having N tap positions and M coefficients, where N and M are integers and N is greater than M which is greater than 2;

means for adaptively selecting M of the N tap positions and for assigning the M coefficients to the selected M tap positions; and means for adaptively updating the selected M coefficients both in value and in correspondence to tap positions in the sparse digital filter;

where the sparse digital filter includes:

a first finite impulse response (FIR) filter which processes modulated digital samples to produce filtered modulated digital samples;

a derotator which mixes the filtered modulated digital samples with an estimated carrier signal to produce derotated digital samples;

an infinite impulse response (IIR) filter which processes the derotated digital samples, the IIR filter including:

summing means which adds filtered symbols to the derotated digital samples to produce equalized digital samples; and a slicer which quantizes the equalized digital samples according to a predetermined alphabet to produce digital symbols;

a second FIR filter which processes the digital symbols to produce the filtered digital symbols.

28. A transmission channel equalizer according to claim 26 or 27 wherein the means for adaptively updating the selected M coefficients uses a decision directed algorithm.

29. A transmission channel equalizer for equalizing a vestigial sideband modulated (VSB) signal, the equalizer comprising:

a first finite impulse response (FIR) filter which processes modulated digital samples to produce filtered modulated digital samples;

means for calculating a single axis constant modulus algorithm (SACMA) error term for the filtered modulated digital samples;

an infinite impulse response (IIR) filter which processes the filtered modulated digital samples, the IIR filter including:

summing means which adds further filtered digital samples to the filtered modulated digital symbols to produce output equalized digital samples;

a second FIR filter which processes the equalized digital samples to produce the further filtered digital samples; and means for applying the calculated SACMA error term to update coefficient values for both the FIR filter and the IIR filter.

30. A transmission channel equalizer for equalizing a VSB signal according to claim 29, further including:

a derotator which mixes the filtered demodulated digital symbols with an estimated carrier signal to produce derotated digital symbols;

a slicer which quantizes the derotated digital symbols according to a predetermined alphabet to produce quantized symbols;

means for subtracting the derotated digital symbols from the quantized symbols to produce a baseband decision directed (DD) error term;

a rerotator which mixes the quantized symbols with the estimated carrier signal to produce quantized modulated digital symbols for application to the IIR filter as the filtered modulated digital symbols and which mixes the base band DD error term with the estimated carrier signal to produce a passband DD error term; and means for applying the passband DD error term to update coefficient values for both the FIR filter and the IIR filter.

31. A transmission channel equalizer according to claim 30 wherein the rerotator includes a first rerotator which mixes the quantized symbols with the estimated carrier signal to produce the quantized modulated digital symbols and a second rerotator which mixes the base band DD error term with the estimated carrier signal to produce the passband DD error term.

32. A transmission channel equalizer for equalizing a VSB signal according to claim 29, wherein the VSB signal has a carrier signal component and the equalizer further comprises:

means for subtracting the carrier signal from the filtered demodulated digital symbols before applying the filtered demodulated digital symbols to the slicer; and means for adding the carrier signal to the quantized modulated digital symbols before applying the quantized modulated digital symbols to the IIR filter.

33. A transmission channel equalizer for equalizing a VSB signal according to claim 29, wherein the modulated digital symbols are provided at a sampling rate of $F_S$, the equalizer further comprising:

means for shifting the frequency of the quantized symbols by $-F_S/4$ to provide output equalized quantized symbols in staggered QAM format.

34. A transmission channel equalizer for equalizing a vestigial sideband modulated (VSB) signal, the equalizer comprising:

a first finite impulse response (FIR) filter which processes modulated digital samples to produce filtered modulated digital samples;

a derotator which mixes the filtered modulated digital samples with an estimated carrier signal to produce derotated digital samples;

means for calculating a baseband single axis constant modulus algorithm (SACMA) error term for the derotated digital samples;

a rerotator which mixes the SACMA error term with the estimated carrier signal to produce a passband SACMA error term;

an infinite impulse response (IIR) filter which processes the derotated digital samples, the IIR filter including:

summing means which adds filtered derotated digital samples to the derotated digital samples to produce output equalized digital samples; and a second FIR filter which processes the output equalized digital samples to produce the filtered derotated digital samples;

means for calculating a baseband single axis constant modulus algorithm (SACMA) error term for the output equalized digital samples;

a rerotator which mixes the SACMA error term with the estimated carrier signal to produce a passband SACMA error term; and means for applying the baseband SACMA error term to update coefficient values for the IIR filter and for applying the passband SACMA error term to update coefficient values for the FIR filter.

35. A transmission channel equalizer for equalizing a VSB signal according to claim 34, further including:

a slicer which quantizes the derotated digital symbols according to a predetermined alphabet to produce quantized symbols;

means for subtracting the derotated digital symbols from the quantized symbols to produce a baseband decision directed (DD) error term; wherein the rerotator mixes baseband DD error term with the estimated carrier signal to produce a passband DD error term; and means for applying the passband DD error term to update coefficient values for the FIR filter and for applying the baseband DD error term to update coefficient values for the IIR filter.

36. A transmission channel equalizer which equalizes vestigial sideband (VSB) or quadrature amplitude modulated (QAM) signals comprising:
    a first finite impulse response (FIR) filter, having a plurality of coefficients, which processes modulated digital samples to produce filtered digital samples;
    an infinite impulse response (IIR) filter which processes the filtered digital samples, the IIR filter including:
    summing means which adds further filtered digital samples to the filtered digital samples to produce output equalized digital samples; and
    a second FIR filter, having a second plurality of coefficients, which processes the output equalized digital samples to produce the further filtered digital samples; and
    means for updating the coefficients of the first and second FIR filters comprising:
    acquisition means for calculating a constant modulus algorithm (CMA) error term for QAM signals and a single axis constant modulus algorithm (SACMA) error term for VSB signals;
    tracking means for calculating a decision directed (DD) error term; and
    means for applying the CMA error term or the SACMA error term to both the first and second FIR filters and then applying the DD error term to the first and second FIR filters.

37. A transmission channel equalizer according to claim 36, wherein the means for calculating the DD error term includes:
    means, when a VSB signal is being processed for converting the equalized digital samples into a pseudo QAM signal;
    a slicer for estimating symbol values from one of the pseudo QAM signal and the equalized digital samples; and
    a subtracter which subtracts the estimated symbol values from the one of the equalized digital samples and the pseudo QAM signal to generate the DD error term.

38. A transmission channel equalizer for equalizing a vestigial sideband modulated (VSB) signal, the equalizer comprising:
    a finite impulse response (FIR) filter which processes modulated digital samples to produce filtered modulated digital samples;
    means for calculating a single axis constant modulus algorithm (SACMA) error term for the filtered modulated digital samples;
    means for applying the calculated SACMA error term to update coefficient values for the FIR filter.

39. A transmission channel equalizer according to claim 38, wherein the FIR filter is a sparse filter.

40. A transmission channel equalizer for equalizing a vestigial sideband modulated (VSB) signal, the equalizer comprising:
    an infinite impulse response (IIR) filter which processes modulated digital samples to produce filtered modulated digital samples;
    means for calculating a single axis constant modulus algorithm (SACMA) error term for the filtered modulated digital samples;
    means for applying the calculated SACMA error term to update coefficient values for the IIR filter.

41. A transmission channel equalizer according to claim 40, wherein the IIR filter is a sparse filter.

42. A method for adaptively updating a transmission channel equalizer having a sparse digital filter which has N tap positions and M coefficients where N and M are integers and N is greater than M which is greater than 2, the method comprising the steps of:
    identifying a plurality of tap positions having corresponding coefficient values that are less than a threshold value, $\epsilon$;
    comparing each of the identified plurality of tap positions to a further threshold value $\delta$;
    deleting all of the tap positions having a value less than $\delta$ from the M tap positions;
    selecting one tap position for each deleted tap position to provide M selected tap positions; and
    adaptively updating the selected M coefficients in value responsive to an objective function to cause the filter to produce an equalized output signal.

43. A method for adaptively updating a transmission channel equalizer having a sparse digital filter which has N tap positions and M coefficients where N and M are integers and N is greater than M which is greater than 2, the method comprising the steps of:
    identifying one of the tap positions having a corresponding coefficient value which is less than any other coefficient value;
    deleting the identified tap position from the M tap positions;
    selecting one of the tap positions to replace the deleted tap position to create a new set of M selected tap positions; and
    adaptively updating the M coefficients corresponding to the M selected tap positions in value responsive to an objective function to cause the filter to produce an equalized output signal.

44. A method for equalizing received signals which are either vestigial sideband (VSB) or quadrature amplitude modulated (QAM) signals comprising the steps of:
    processing the received signals to produce modulated digital symbols;
    forward filtering the modulated digital symbols according to a first frequency response characteristic to produce filtered modulated digital symbols;
    feedback filtering the filtered modulated digital symbols according to a second frequency response characteristic to produce feedback filtered digital symbols;
    summing the feedback filtered digital symbols and the filtered modulated digital symbols to produce output equalized digital symbols; and
    adaptively updating the first and second frequency response characteristics comprising the steps of:
    calculating a constant modulus algorithm (CMA) error term for QAM signals and a single axis constant modulus algorithm (SACMA) error term for VSB signals;
    calculating a decision directed (DD) error term; and
    applying one of the CMA error term and the SACMA error term to adapt both the first and second frequency response characteristics and then applying the DD error term to adapt both the first and second frequency response characteristics.

* * * * *